(12) United States Patent
Matsumoto et al.

(10) Patent No.: US 9,515,829 B2
(45) Date of Patent: Dec. 6, 2016

(54) INFORMATION DISTRIBUTION METHOD, INFORMATION DISTRIBUTION SYSTEM AND IN-VEHICLE TERMINAL

(71) Applicant: Clarion Co., Ltd., Saitama (JP)

(72) Inventors: Takashi Matsumoto, Kawasaki (JP); Atsushi Shimizu, Yokohama (JP); Katsuyuki Umezawa, Machida (JP); Tatsuaki Osafune, Kawasaki (JP); Koichi Mitsui, Koshigaya (JP); Hiroyoshi Endo, Kawaguchi (JP)

(73) Assignee: Clarion Co., Ltd., Saitama (JP)

( * ) Notice: Subject to any disclaimer, the term of this patent is extended or adjusted under 35 U.S.C. 154(b) by 597 days.

(21) Appl. No.: 13/723,369

(22) Filed: Dec. 21, 2012

(65) Prior Publication Data
US 2013/0179689 A1    Jul. 11, 2013

(30) Foreign Application Priority Data
Jan. 10, 2012  (JP) ................................ 2012-002607

(51) Int. Cl.
*H04L 29/06* (2006.01)
*H04L 9/32* (2006.01)
(Continued)

(52) U.S. Cl.
CPC . *H04L 9/32* (2013.01); *G06F 8/61* (2013.01); *H04L 9/08* (2013.01); *H04W 4/001* (2013.01);
(Continued)

(58) Field of Classification Search
CPC ....................................................... H04L 9/32
(Continued)

(56) References Cited

U.S. PATENT DOCUMENTS 6,718,470 B1 *   4/2004   Adams ................... G06F 21/33
                                                            713/175
9,020,695 B2 *   4/2015   Nagai .................... G06F 17/00
                                                            701/36
(Continued)

FOREIGN PATENT DOCUMENTS

CN          102291454 A        12/2011
DE    10 2008 056 0745 A1       5/2010
(Continued)

OTHER PUBLICATIONS

Guide to purchase downloadable contents at <URL:http://chizu-route-susumu.j[/ec_help/index.html> (Searched on Sep. 12, 2011).
(Continued)

*Primary Examiner* — Harris C Wang
(74) *Attorney, Agent, or Firm* — Volpe and Koenig, P.C.

(57) ABSTRACT

[Objective] When installing software into an in-vehicle terminal from a server, it is required to prevent the software from being installed into an unsuitable terminal, and to reduce time and efforts for data input and download, thereby improving the convenience of the user.
[Solution] In an information distribution system, terminal identification information and a terminal unique key for an in-vehicle terminal are stored in a server as well as in itself. The in-vehicle terminal transmits the terminal identification information to the server for terminal authentication via a communication terminal after encrypting with the terminal unique key, and then the server transmits encrypted software to the communication terminal. The communication terminal transmits the encrypted software to the in-vehicle terminal, which in turn obtains a software unique key encrypted with the terminal unique key from the server and decrypts the encrypted software for installation using the software unique key.

8 Claims, 13 Drawing Sheets

(51) Int. Cl.
*G06F 9/445* (2006.01)
*H04L 9/08* (2006.01)
*H04W 4/00* (2009.01)
*H04W 4/04* (2009.01)
*H04W 12/02* (2009.01)
*H04W 12/06* (2009.01)

(52) U.S. Cl.
CPC ............. *H04W 4/046* (2013.01); *H04W 12/02* (2013.01); *H04W 12/06* (2013.01)

(58) Field of Classification Search
USPC ........................................................ 713/171
See application file for complete search history.

(56) References Cited

U.S. PATENT DOCUMENTS

| | | | | |
|---|---|---|---|---|
| 2003/0147534 | A1* | 8/2003 | Ablay | H04L 9/3271 380/270 |
| 2003/0200459 | A1* | 10/2003 | Seeman | G06F 21/10 726/26 |
| 2004/0150509 | A1* | 8/2004 | Dunn | B60R 25/00 340/5.72 |
| 2005/0187674 | A1 | 8/2005 | Ando | |
| 2006/0167616 | A1 | 7/2006 | Yamane et al. | |
| 2008/0027602 | A1* | 1/2008 | Yeap | B60R 25/04 701/31.4 |
| 2009/0316673 | A1* | 12/2009 | Yagley | H04W 12/06 370/338 |
| 2011/0083011 | A1* | 4/2011 | DiCrescenzo | H04L 9/006 713/158 |
| 2012/0311322 | A1* | 12/2012 | Koyun | G06Q 20/3227 713/156 |

FOREIGN PATENT DOCUMENTS

| | | |
|---|---|---|
| JP | 2004-171069 A1 | 6/2004 |
| JP | 2004-240655 A | 8/2004 |
| JP | 2005-244313 A | 9/2005 |
| JP | 2006-208155 A | 8/2006 |
| JP | 2006-238142 A | 9/2006 |
| JP | 2010-199717 A1 | 9/2010 |
| JP | 2010-211543 A | 9/2010 |
| JP | 2010-226336 A | 10/2010 |

OTHER PUBLICATIONS

Chinese Office Action for Chinese Patent Appln. No. 201210562461.9 dated May 20, 2015, 7 pages.
Japanese Office Action for Japanese Patent Appln. No. 2012-002607 dated Sep. 8, 2015, 6 pages.

* cited by examiner

FIG.5

In-vehicle terminal management DB
300

| Server-side terminal identification information | Server-side terminal unique key | Last authentication timestamp |
|---|---|---|
| 012345678 | aX53oi=p754n3hhb | 2011/07/01 11:45:50 |
| 012345679 | +9h4ca37g-ZLri55 | 2011/12/24 00:01:01 |
| ... | ... | ... |

301  302  303

Software acquisition process

INFORMATION DISTRIBUTION METHOD, INFORMATION DISTRIBUTION SYSTEM AND IN-VEHICLE TERMINAL

CROSS REFERENCE TO RELATED APPLICATION

The present application claims benefit of the filing date of Japanese Patent Application No. 2012-002607 filed on Jan. 10, 2012 which is incorporated herein by reference.

TECHNICAL FIELD

The present invention is related to an information distribution method, an information distribution system and an in-vehicle terminal, wherein information is distributed from a server to an in-vehicle terminal such as a car navigation terminal that is externally connectable to a communication device such as a mobile phone.

BACKGROUND OF THE INVENTION

Communication terminals such as sophisticated mobile phones (so-called "smart phones") have been popular that perform data communication using mobile communication networks such as a 3G (3rd Generation) telephone network and a wireless LAN (Local Area Network). A sophisticated mobile phone can execute various software programs that can be installed by its user, as needed, like a PC (Personal Computer). Sophisticated mobile phones have such characteristics and therefore a high affinity with Web services, provided with variety of services.

At in-vehicle terminals such as car navigation terminals, having no communication capability in many cases, services based on data communication, such as Web services for sophisticated mobile phones, are used indirectly, using terminal-to-terminal communications with sophisticated mobile phones, via USB (Universal Serial Bus), Bluetooth (registered trademark) or the like. For example, by searching for destination information using an internet search feature of a sophisticated mobile phone and directing a route search to that destination, the location information is sent to the car navigation terminal. Then, a route search is performed in a car navigation terminal, and the result is displayed thereon.

Such a cooperation between a sophisticated mobile phone and an in-vehicle terminal is realized by a cooperation between software programs installed therein respectively. Cooperative functions provided by software facilitate the addition of software programs later by the user, corresponding to new services, for example. In general, software distribution for software programs running in a sophisticated mobile phone is implemented by a server, via a communication network, such as distribution of application programs, updates to an OS (Operating System), or the like. Software distribution to an in-vehicle terminal for software programs running therein is also implemented by a server, via a communication network, through connection with a sophisticated mobile phone.

However, considering that an in-vehicle terminal is relevant to human safety, it is necessary to prevent the installation of software programs to an in-vehicle terminal, impairing the safety of the in-vehicle terminal, such as software with insufficient verification test at the in-vehicle terminal, software inapplicable to the in-vehicle terminal to be distributed, software with a behavior that threatens the safety deliberately, or the like.

To achieve this, there is a technique described in the Non-Patent Literature 1, "Guide to purchase downloadable contents" at <URL: http://chizu-route-susumu.jp/echelp/index.html> (searched on Sep. 12, 2011). In the technique described in Non-Patent Literature 1, a terminal authentication is performed by the user first inputting terminal identification information of the in-vehicle terminal, such as a product code and a serial number, through a browser on the PC. As the sort of the in-vehicle terminal is identified by the terminal authentication, it is possible for the server side to identify the software program applicable to the in-vehicle terminal. The software program applicable to the in-vehicle terminal is distributed from the server and stored in a removable media by the PC. By inserting the removable media to the vehicle terminal, the software program designated by the user is installed in the in-vehicle terminal.

However, the technique described in Non-Patent Literature 1 requires time and efforts for data input and software download, because the user needs to obtain terminal identification information from the in-vehicle terminal in advance, input the terminal identification information on the PC, and then install software by inserting a removable media to the in-vehicle terminal.

As a technique for solving this problem, there is a technique that is described in Patent Literature 1, Japanese Laid-Open Patent Application No. 2004-171069. In the technique described in Patent Literature 1, the authentication is performed using unique identification information of mobile phone that is easily identified, and the right to use of the software is issued to the mobile phone, when purchasing software for a PC or other terminals such as an in-vehicle terminal using a mobile phone. When a terminal is connected to the server, in the state with another connection to the mobile phone having the right to use of the software, the unique identification information of the mobile phone and the right to use of the software in the mobile phone is transmitted to the server. Then, the software is distributed to the terminal after verifying the right to use of the software for the terminal. Thus, the technique described in Patent Literature 1 can achieve software distribution, without complicated input operation by the user.

SUMMARY OF THE INVENTION

Description of the Related Art

However, in the technique described in Patent Literature 1, a subject for the authentication is a mobile phone, but not a terminal to which a mobile phone is connected and software is installed. As in-vehicle terminals are not provided with a communication function in many cases, this technique is not applicable to such terminals. Further, if the terminal is not authenticated, it is possible that the software may be installed into a terminal not to be meant for distribution. On this point, even with the technique described in Non-Patent Literature 1, a removable media can be inserted also into a terminal having different terminal identification information, so as a result the software may be installed unjustly into an in-vehicle terminal having different terminal identification information, after software distribution.

In addition to this problem, for example, when one family owns several automobiles and installs a software program in each of a plurality of in-vehicle terminals, or when a software program is installed in an automobile not used usually such as a car for car-sharing or a rental car, the user needs to obtain and enter the terminal identification information each time for downloading the software program dedicated to the in-vehicle terminal, in the technique described in Non-Patent Literature 1 and Patent Literature 1, thus having a problem of requiring time and efforts for data input and installation.

The present invention is made considering the above mentioned background, to provide an information distribution method, an information distribution system and an in-vehicle terminal for reducing the time and efforts for data input and download, thereby improving the convenience of the user, while preventing a software program from being installed in one of in-vehicle terminals not to be meant for distribution when distributing the software applicable to the in-vehicle terminal not equipped with the communication function.

Means for Solving the Problems

Unique terminal identification information and a terminal unique key are stored in the in-vehicle terminal of an information distribution system, according to the present invention, and the same set of information is stored in the server. Then the in-vehicle terminal transmits the terminal identification information to the server via a communication terminal (e.g., a sophisticated mobile phone), and the server performs terminal authentication based on the terminal identification information stored in the server, and transmits encrypted software to the communication terminal, when the authentication is successful. The communication terminal sends the encrypted software to the in-vehicle terminal, and then the in-vehicle terminal obtains a software unique key, encrypted with the terminal unique key at the server, via the communication terminal, and decrypts the encrypted software using the software unique key, for installation.

Effects of Invention

According to the present invention, when distributing the software applicable to the in-vehicle terminal not equipped with communication function, it is possible to prevent the software from being installed to in-vehicle terminals not to be meant for distribution, and to provide an information distribution method, an information distribution system and an in-vehicle terminal for reducing the time and efforts for data input and download, thereby improving the convenience of the user.

BRIEF DESCRIPTION OF THE DRAWINGS

FIG. 5 is a diagram explaining a configuration of the data stored in the in-vehicle terminal management DB according to the first embodiment of the present invention.

EMBODIMENTS OF THE INVENTION

Figure 1:
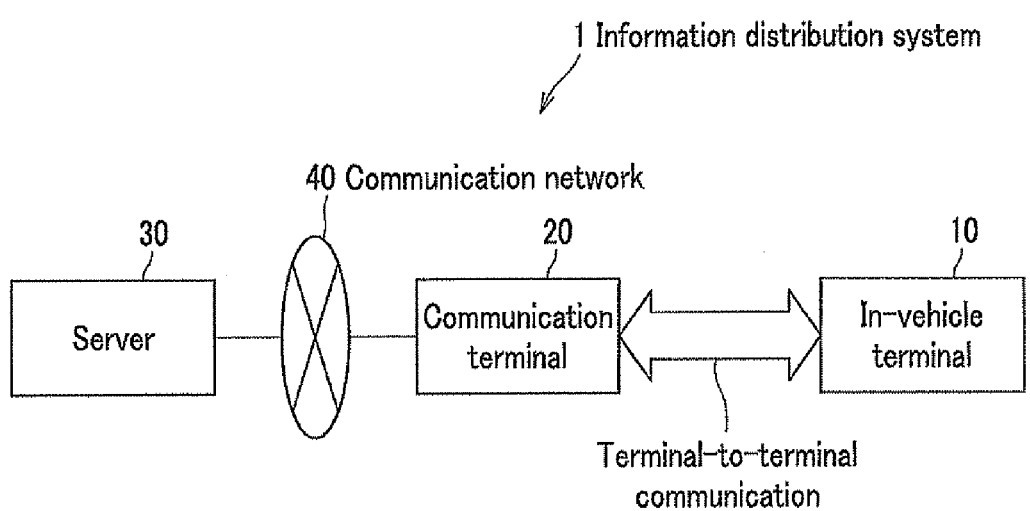
FIG. 1 is a diagram explaining the overall configuration of the information distribution system according to the first embodiment of the present invention.

Next, an information distribution system 1 and others will be described, according to embodiments for implementing the present invention (hereinafter referred to as "embodiments of the present invention"). First, an example for a single in-vehicle terminal 10 to obtain a software program from a server 30 via a communication terminal 20 will be described in an information distribution system 1 according to a first embodiment of the present invention. Then, an example for multiple in-vehicle terminals 10 to obtain a software program via a communication terminal 20 will be described in an information distribution system 1 according to a second embodiment of the present invention.

Here, the communication terminal 20 according to the embodiments of the present invention is a sophisticated mobile phone, for example, but it may be a communication device that is connectable to the in-vehicle terminal 10 and the server 30 for transmission and reception of software or the like.

First Embodiment

To begin with, a description will be given on the information distribution system 1 according to the first embodiment of the present invention. The first embodiment of the present invention is an example for a single in-vehicle terminal 10 to obtain a software program from the server 30 via the communication terminal 20.

FIG. 1 is a diagram explaining the overall configuration of the information distribution system 1 according to a first embodiment of the present invention.

As shown in FIG. 1, the information distribution system 1 according to the first embodiment of the present invention, includes the in-vehicle terminal 10, the communication terminal 20 and the server 30. The in-vehicle terminal 10 is an in-vehicle terminal (for example, a car navigation system) not provided with a communication function via a communication line or the like, and connected with the communication terminal 20 via a terminal-to-terminal communication. Here, a terminal-to-terminal communication refers to a communication function between equipments, such as USB, Bluetooth and wireless LAN (Local Area Network), generally provided to the in-vehicle terminal 10 and the communication terminal 20. The communication terminal 20 is a sophisticated mobile phone or the like, a smartphone for example, for performing data communication using the mobile communication network, such as a 3G network, or a wireless LAN. The communication terminal 20 is connected to the internet via a communication network 40. In addition, the in-vehicle terminal 10 can be connected to the internet via a communication terminal 20. The server 30 includes the capability to distribute software to the in-vehicle terminal 10 via the communication terminal 20, and the server 30 and the communication terminal 20 are connected with HTTP (Hypertext Transfer Protocol) through the internet.

Next, each device constituting the information distribution system 1, according to the first embodiment of the present invention, will be described in detail.

<In-Vehicle Terminal>

Figure 2:
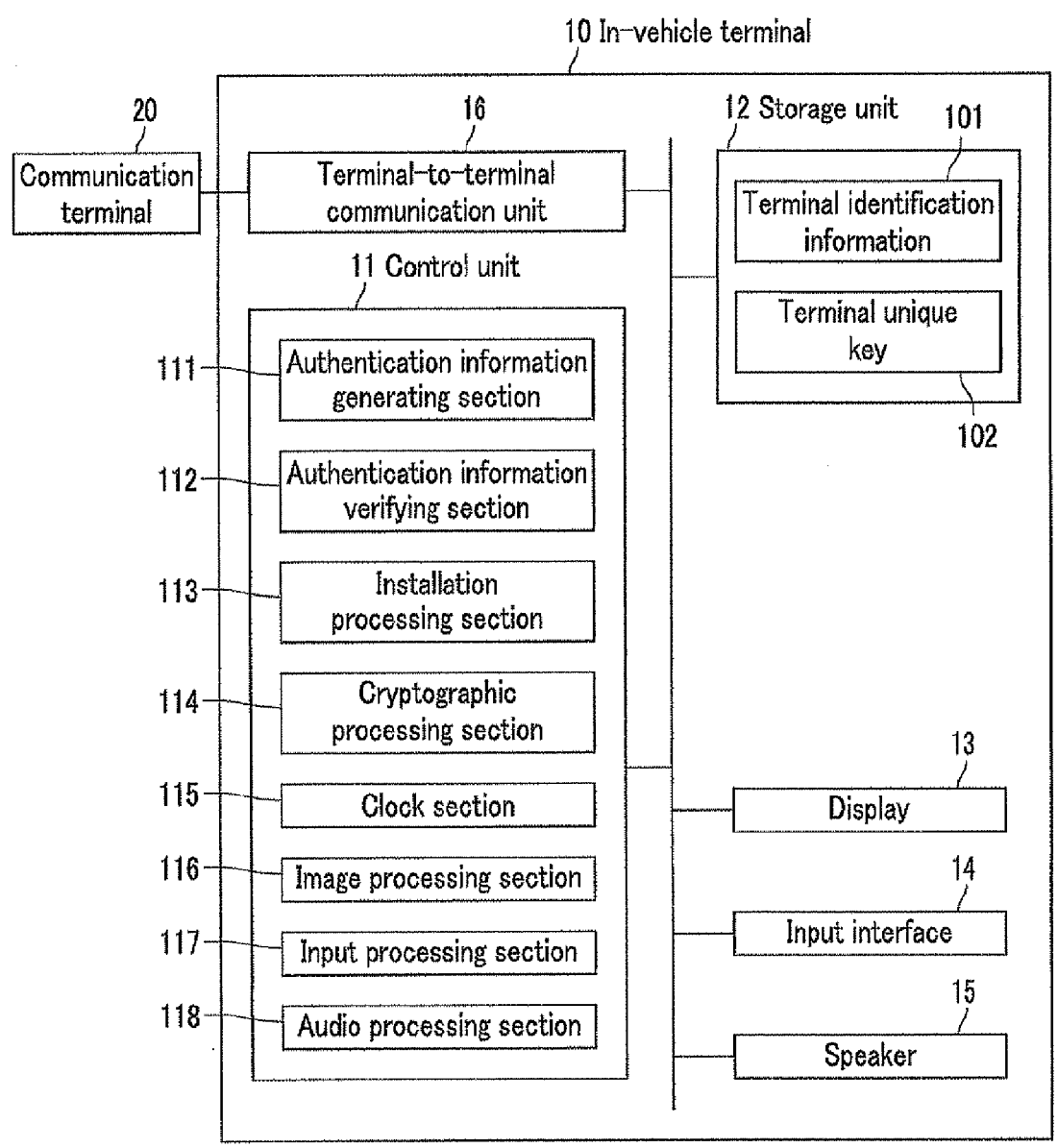
FIG. 2 is a functional block diagram showing an example configuration of an in-vehicle terminal according to the first embodiment of the present invention.

FIG. 2 is a functional block diagram showing a example configuration of the in-vehicle terminal 10 according to the first embodiment of the present invention.

As shown in FIG. 2, the in-vehicle terminal 10 is configured to include a control unit 11, a storage unit 12, a display 13, an input interface 14, a speaker 15, and a terminal-to-terminal communication unit 16.

The control unit 11 controls the entire in-vehicle terminal 10, and it is configured to include an authentication information generating section 111, an authentication information verifying section 112, an installation processing section 113, a cryptographic processing section 114, a clock section 115, an image processing section 116, an input processing section 117 and an audio processing section 118. Here, the functions of the control unit 11 is realized, for example, by CPU (Central Processing Unit) executing a program, stored in the storage unit 12 of the in-vehicle terminal 10, in memory (such as RAM), which is not shown.

The authentication information generating section 111 generates terminal authentication information and software unique key request information, used for software installation from the server 30.

Specifically, the authentication information generating section 111 generates a terminal authentication information (hereinafter referred to as information "A"), including (A-1) terminal identification information 101, which is in the storage unit 12 and will be described later, (A-2) timestamp obtained from the clock section 115, and (A-3) encrypted information of the terminal identification information 101 and the timestamp, both encrypted with a terminal unique key 102 in the storage unit 12 by the cryptographic processing section 114.

In addition, the authentication information generating section 111 generates software unique key request information (hereinafter referred to as information "B"), including (B-1) terminal identification information 101, which is in the storage unit 12 and will be described later, (B-2) timestamp obtained from the clock section 115, (B-3) identification information of an encrypted software program, obtained from the server 30 via the communication terminal 20, and (B-4) encrypted information of the terminal identification information 101, the timestamp, and the identification information of the encrypted software program, all encrypted with the terminal unique key 102 in the storage unit 12 by the cryptographic processing section 114.

The authentication information verifying section 112 validates software unique key authentication information (hereinafter referred to as information "C"), obtained from the server 30 via the communication terminal 20, verifying whether or not it has been tampered with.

Note that the software unique key authentication information (the information "C") is generated by the authentication information generating section 313, in the server 30, which will be described later.

This software unique key authentication information (the information "C") includes (C-1) identification information of the encrypted software program, and (C-2) encrypted information of the identification information of the encrypted software program and software unique key, both encrypted with a server-side terminal unique key 302 (refer to FIG. 5 which will be described later).

The software unique key authentication information will be described in detail later.

More specifically, the authentication information verifying section 112 decrypts the (C-2) encrypted information in the software unique key authentication information (the information "C"), using the terminal unique key 102 stored in its own storage unit 12, and verifies whether or not the decrypted identification information of the encrypted software program is matched to the (C-1) identification information of the encrypted software program in the software unique key authentication information. If it is not matched, the authentication information verifying section 112 ends the process as software unique key authentication information has been tampered with. On the other hand, if it is matched, the authentication succeeds and the authentication information verifying section 112 decrypts the encrypted software program stored in the storage unit 12, using a software unique key obtained at the decryption.

The installation processing section 113 installs the software decrypted by the authentication information verifying section 112.

The cryptographic processing section 114 encrypts the terminal identification information 101 and the timestamp, using the terminal unique key 102 in the storage unit 12, based on the instruction from the authentication information generating section 111. Then it passes the encrypted information to the authentication information generating section 111.

Further, the cryptographic processing section 114 encrypts the terminal identification information 101, the timestamp, and the identification information of the encrypted software program, with the terminal unique key 102 in the storage unit 12, based on the instruction also from the authentication information generating section 111. Then it passes the encrypted information to the authentication information generating section 111.

Upon receiving an instruction from the authentication information generating section 111, the clock section 115 passes the current timestamp to the authentication information generating section 111.

The image processing section 116 performs a process for generating a display image indicative of the current stage of the software installation process and displaying on the display 13.

The input processing section 117 acquires user input information via the input interface 14.

The audio processing section 118 performs a process for outputting information indicative of the current stage of the software installation process to the speaker 15 as the audio information.

The storage unit 12 is composed of a hard disk, a flash memory or the like, and stores the terminal identification information 101 and the terminal unique key 102.

The terminal identification information 101 is the information for uniquely identifying the in-vehicle terminal 10, representing a product number, a model number, a manufacturing number or the like. The in-vehicle terminal 10 can be uniquely identified with the terminal identification information 101, and then the server 30 can identify the sort of the in-vehicle terminal 10, representing the product number, the type (model), the version, or the like.

Further, the terminal unique key 102 is the information used in the encryption process, different for each in-vehicle terminal 10, that is, for each terminal identification information 101. Note that the same information that of a set of the terminal identification information 101 and the terminal unique key 102 is stored in the server 30 as a set of a server-side terminal identification information 301 and a server-side terminal unique key 302.

The display 13 is a display device that displays information, such as a route and a destination. The display 13 also displays information indicative of the current stage of a software program installation process, through the image processing section 116.

The input interface 14 is an input device such as a touch panel, input buttons, a remote controller or the like.

The speaker 15 outputs information indicating the current stage of the software installation process as the audio information.

The terminal-to-terminal communication unit 16 controls communication via USB, Bluetooth, wireless LAN, or the like, for exchanging information with the communication terminal 20.

<Communication Terminal>

Next, the communication terminal 20 according to the first embodiment of the present invention will be described.

Figure 3:
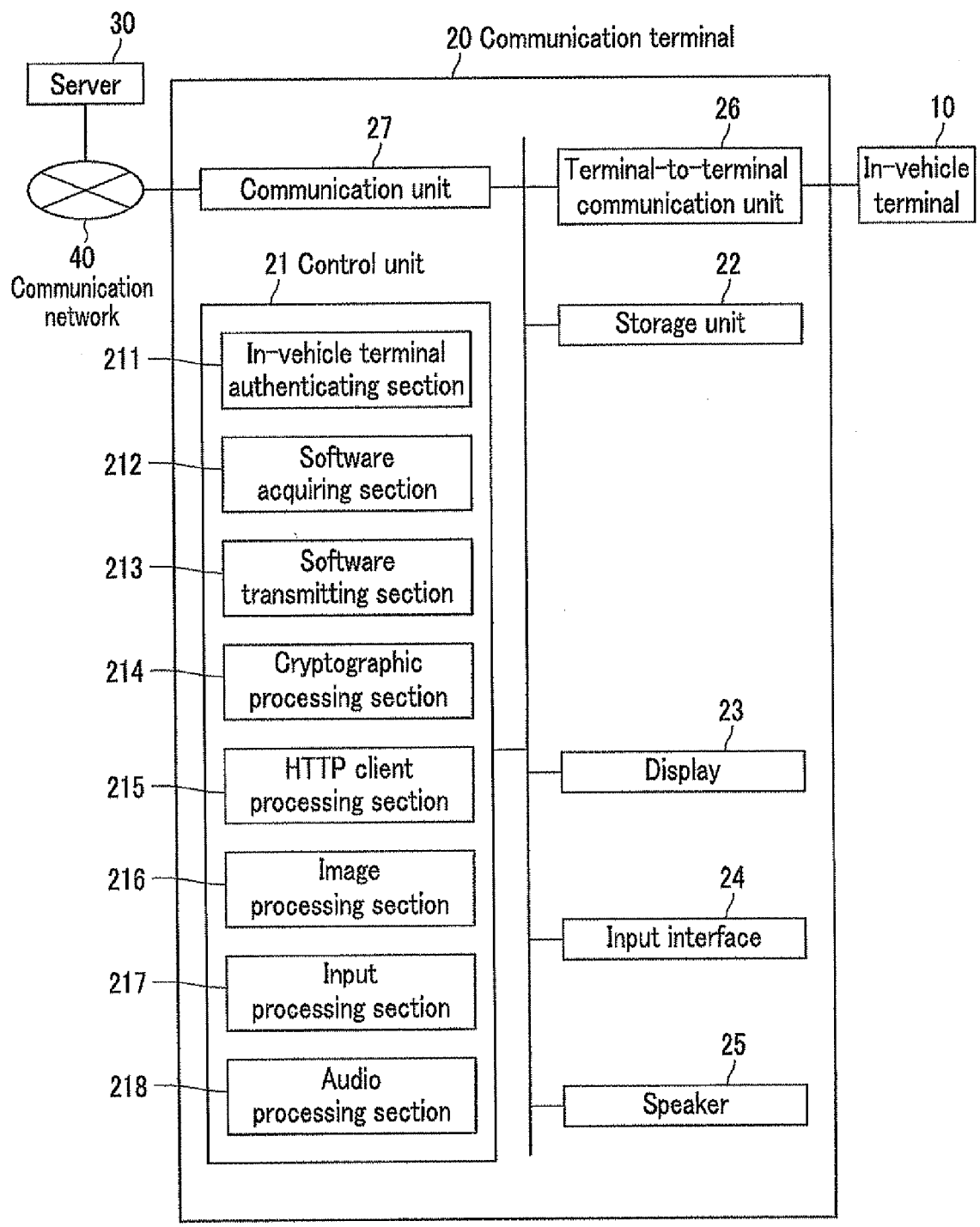
FIG. 3 is a functional block diagram showing an example configuration of a communication terminal according to the first embodiment of the present invention.

FIG. 3 is a functional block diagram showing an example configuration of the communication terminal 20 according to the first embodiment of the present invention.

As shown in FIG. 3, the communication terminal 20 is configured to include a control unit 21, a storage unit 22, a display 23, an input interface 24, a speaker 25, a terminal-to-terminal communication unit 26, and a communication unit 27.

The control unit 21 controls the entire communication terminal 20, and it is configured to include an in-vehicle terminal authenticating section 211, a software acquiring section 212, a software transmitting section 213, a cryptographic processing section 214, a HTTP client processing section 215, an image processing section 216, an input processing section 217, and an audio processing section 218. Note that the functions of the control unit 21 are realized, for example, by a CPU executing a program, stored in the storage unit 22 of the communication terminal 20 and loaded into memory (such as a RAM) which is not shown.

The in-vehicle terminal authenticating section 211 controls the whole terminal authentication process of the in-vehicle terminal 10 connected via the terminal-to-terminal communication.

Specifically, upon receiving an instruction from a user for starting a terminal authentication via the input processing section 217, the in-vehicle terminal authenticating section 211 sends an authentication information request message, requesting the terminal authentication information (the information "A"), to the in-vehicle terminal 10 which is connected via the terminal-to-terminal communication, and then receives the terminal authentication information from the in-vehicle terminal 10.

Next, the in-vehicle terminal authenticating section 211 sends a terminal authentication request message, including the terminal authentication information data, to the server 30. Then, when receiving an authentication success message indicating that the verification of the terminal authentication information succeeds in the server 30, the in-vehicle terminal authenticating section 211 stores the terminal authentication information (the information "A") added to the authentication success message in the storage unit 22. In addition, the in-vehicle terminal authenticating section 211 transmits a terminal authentication completion message, indicating that the terminal authentication is complete, to the in-vehicle terminal 10.

The software acquiring section 212 controls the whole process for obtaining the software program from the server 30.

Specifically, upon receiving an instruction from a user for starting a software acquisition, via the input processing section 217, the software acquiring section 212 sends a software acquisition request message including the terminal authentication information (the information "A") stored in the storage unit 22 to the server 30 via the communication network 40.

Then, upon receipt of the Uniform Resource Locator (URL) of the source for software downloading from the server 30, the software acquiring section 212 accesses the URL to download the software therefrom, via the HTTP client processing section 215, attaching the terminal authentication information (the information "A") stored in its own storage unit 22.

In addition, the software acquiring section 212 receives a software program encrypted with a software unique key (hereinafter, referred to as "encrypted software"), and then saves that encrypted software in the storage unit 22.

The software transmitting section 213 performs a series of processing required for transmitting the encrypted software to the in-vehicle terminal 10 and obtaining the software unique key from the server 30 for the in-vehicle terminal 10 to decrypt the encrypted software.

Specifically, upon receiving an instruction from a user for software installation via the input processing section 217, the software transmitting section 213 sends the encrypted software stored in the storage unit 22 to the in-vehicle terminal 10 connected via the terminal-to-terminal communication.

In addition, upon receipt of the software unique key request information (the information "B") from the in-vehicle terminal 10, the software transmitting section 213 transmits a software unique key request message to which the software unique key request information is added to the server 30 via the communication network 40.

In addition, the software transmitting section 213 receives the software unique key authentication information (the information "C") from the server 30, and transmits it to the in-vehicle terminal 10.

The cryptographic processing section 214 performs encryption processing such as SSL (Secure Sockets Layer)/TLS (Transport Layer Security) for information to be transmitted to and from the server 30 via the communication network 40. Hereinafter, the description will be omitted, but all the information exchanged via communication between the communication terminal 20 and the server 30 is encrypted by the cryptographic processing section 214.

The HTTP client processing section 215 is responsible for transmitting and receiving information based on HTTP (Hyper Text Transfer Protocol) for the URL obtained from the server 30 by the software acquiring section 212.

The image processing unit 216 performs processes of generating a display image indicative of the current stage of the software program installation process at the in-vehicle terminal 10 and displaying the image on the display 23.

The input processing unit 217 acquires the user input information via the input interface 24.

The audio processing unit 218 performs a process of outputting the current stage of the software installation process at the in-vehicle terminal 10 to the speaker 25, as the audio information.

The terminal-to-terminal communication unit 26 controls communication via USB, Bluetooth, wireless LAN, or the like, and exchange information with the in-vehicle terminal 10.

The communication unit 27 controls the information that is transmitted to and from the server 30 via the communication network 40 such as a mobile communication network and a wireless LAN.

<Server>

Next, the server 30 will be described according to the first embodiment of the present invention.

Figure 4:
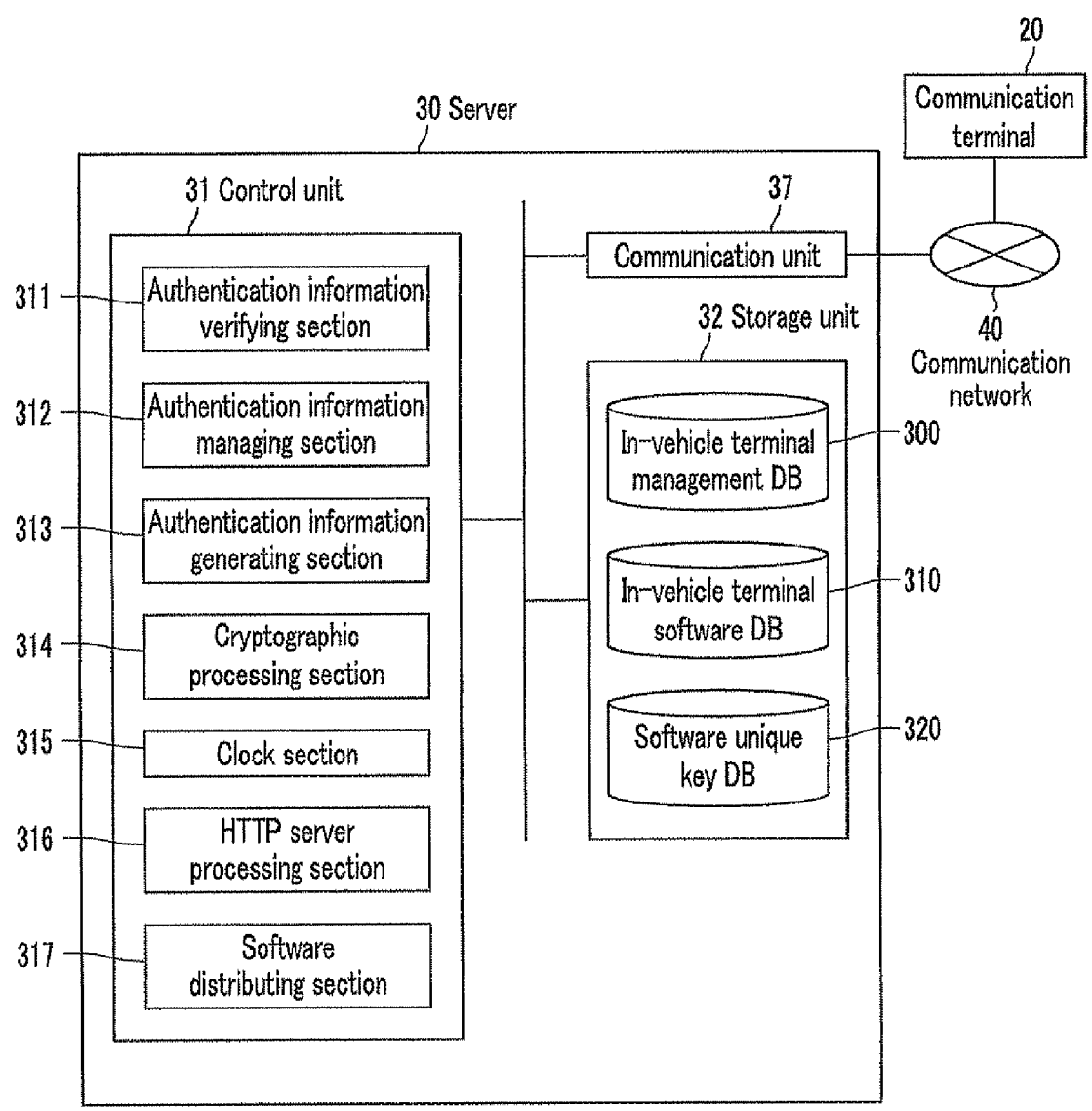
FIG. 4 is a functional block diagram showing an example configuration of a server, according to the first embodiment of the present invention.

FIG. 4 is a functional block diagram showing an example configuration of the server 30 according to the first embodiment of the present invention.

As shown in FIG. 4, the server 30 is configured to include a control unit 31, a storage unit 32, and a communication unit 37.

The storage unit 32 stores an in-vehicle terminal management DB (Data Base) 300, an in-vehicle terminal software DB 310 and a software unique key DB 320.

FIG. 5 is a diagram for explaining the configuration of the data stored in the in-vehicle terminal management DB 300 according to the first embodiment of the present invention.

As shown in FIG. 5, the in-vehicle terminal management DB 300 stores the server-side terminal unique key 302 and a last authentication timestamp 303, in association with the server-side terminal identification information 301.

A set of the server-side terminal identification information 301 and the server-side terminal unique key 302 is the same information as a set of the terminal identification information 101 and the terminal unique key 102 stored in the in-vehicle terminal 10.

The last authentication timestamp 303 is updated by the timestamp attached to an authentication request (terminal authentication information and software unique key request information), each time an terminal authentication is performed and succeeds by an authentication information managing section 312, which will be described later.

Returning to FIG. 4, the in-vehicle terminal software DB 310 is stored with software corresponding to each sort of the in-vehicle terminal 10 in terms of types, versions and so forth.

Further, the software unique key DB 320 stores decryption keys for each of software programs (hereinafter referred to as "software unique key"), stored in the in-vehicle terminal software DB 310. Note that this software unique key is stored in association with identification information of encrypted software which will be described later.

The control unit 31 controls the entire server 30, and it is configured to include an authentication information verifying section 311, an authentication information managing section 312, an authentication information generating section 313, a cryptographic processing section 314, a clock section 315, an HTTP server processing section 316 and a software distributing section 317. Here, the function of the control unit 31 is realized, for example, by a CPU executing a program stored in the storage unit 32 of the server 30 and loaded in memory (such as a RAM) which is not shown.

The authentication information verifying section 311 controls the overall validation of authentication information, such as terminal authentication of the in-vehicle terminal 10 and software distribution.

Specifically, upon receiving a terminal authentication request message including terminal authentication information (the information "A") from the communication terminal 20, the authentication information verifying section 311 acquires the (A-1) terminal identification information 101, the (A-2) timestamp, and the (A-3) encrypted information of the terminal identification information 101 and timestamp, encrypted with the terminal unique key 102, from the terminal authentication information. Then, the authentication information verifying section 311 performs a search in the in-vehicle terminal management DB 300 in the storage unit 32, using the (A-1) terminal identification information 101 acquired from the terminal authentication information as a key. More specifically, the authentication information verifying section 311 first searches for the server-side terminal identification information 301 matched to the (A-1) terminal identification information 101, to obtain the last authentication timestamp 303 thereof.

Next, the authentication information verifying section 311 compares a timestamp value left after subtracting the predetermined threshold time value from the last authentication timestamp 303 with the (A-2) timestamp value. If the time value left after subtracting the predetermined threshold time value from the last authentication timestamp 303 is newer than the (A-2) timestamp value, the authentication information verifying section 311 stops processing as the authentication being unsuccessful, because there is a possibility of unauthorized access, such as a replay attack. On the contrary, if the time value left after subtracting the predetermined threshold time value from the last authentication timestamp 303 is older than (A-2) timestamp value, the authentication information verifying section 311 encrypts the (A-1) terminal identification information 101 and the (A-2) timestamp of the terminal authentication information, respectively, using the server-side terminal unique key 302 via the cryptographic processing section 314. Then, if the result of this encryption is matched with the (A-3) encrypted information encrypted at the in-vehicle terminal 10, the authentication information verifying section 311 determines that the authentication request is from the in-vehicle terminal 10 having the correct terminal unique key 102, and that the authentication succeeds.

Note that, when the terminal authentication information (the information "A") is the first authentication request from the in-vehicle terminal 10 to the server 30 and is not stored in the last authentication timestamp 303, the authentication information verifying section 311 does not perform compare the (A-2) timestamp with the last authentication timestamp 303, and encrypts the (A-1) terminal identification information 101 and the (A-2) timestamp of the terminal authentication information, respectively, using the server-side terminal unique key 302, and goes ahead to determine whether or not the encrypted result is matched to the (A-3) encrypted information.

Here is a reason for introducing a threshold value. If the terminal authentication information is determined to be such information as is generated upon connection of the in-vehicle terminal 10 and invalidated after disconnecting the communication, it becomes impossible to perform a process to be performed only between the communication terminal 20 and the server 30, excluding the in-vehicle terminal 10, such as a software acquisition process shown in FIG. 7 which will be described later, thus impairing the convenience of the user. On the contrary, if the terminal authentication information is determined to be such information as is generated upon connection of the in-vehicle terminal 10 and then valid forever, it becomes possible to do unauthorized access permanently, in case that terminal authentication information has leaked, since the terminal authentication information is a fixed value when sent to the server 30 at a connection time. For solving these problems, the present invention aims to reduce a risk of unauthorized access being done without losing the convenience of the user, by providing a predetermined period of time, or a threshold value, and determining terminal authentication information having the timestamp value older than the threshold value as invalid information. In addition, it can facilitate the operation by providing a margin for the threshold value, considering a case that there is a gap in the timestamp values represented by the clock sections 315, 115 in the server 30 and the in-vehicle terminal 10, respectively, or a case that a connection is impossible between the server and the in-vehicle terminal 10 due to communication situation.

Note that this threshold value is set by an administrator for the service operation, with predetermined time value (in minutes, hours, or days etc.). The shorter the threshold value is, the more the unauthorized access by a third party can be prevented, but also the higher the possibility of authentication information is invalidated and even a process of the legitimate user may be treated as unauthorized access when delayed. On the other hand, the longer the threshold value is, the less the authentication information for the legitimate user is invalidated, but also the higher the possibility is for unauthorized access by a third party.

In addition, upon receipt of a software unique key request message including software unique key request information (the information "B"), from the communication terminal 20, the authentication information verifying section 311 obtains the (B-1) terminal identification information 101, the (B-2) timestamp, the (B-3) identification information of an encrypted software and the (B-4) encrypted information of the terminal identification information 101, the timestamp, and the identification information of the encrypted software, all encrypted with the terminal unique key 102 from the software unique key request information, and searching is performed in the in-vehicle terminal management DB 300 within the storage unit 32. Specifically, the authentication information verifying section 311 first searches for the server-side terminal identification information 301 that matches the (B-1) terminal identification information 101, obtained from the software unique key request information, for obtaining the last authentication timestamp 303.

Next, the authentication information verifying section 311 compares a timestamp value left after subtracting the predetermined threshold value from the last authentication timestamp 303 in the in-vehicle terminal management DB 300 with the (B-2) timestamp value. If the value obtained by subtracting the predetermined threshold value from the last authentication timestamp 303 is newer than the (B-2) timestamp, the authentication information verifying section 311 stops processing as the authentication being unsuccessful, because there is a possibility of unauthorized access such as a replay attack. On the contrary, if the value obtained by subtracting the predetermined threshold value from the last authentication timestamp 303 is older than the (B-2) timestamp, the authentication information verifying section 311 encrypts the (B-1) terminal identification information 101, the (B-2) timestamp and the (B-3) identification information of the encrypted software of the software unique key request information, respectively, using the server-side terminal unique key 302, via the cryptographic processing section 314. Then, if the result of this encryption is matched to the (B-4) encrypted information, encrypted at the in-vehicle terminal 10, the authentication information verifying section 311 determines that the authentication request is from the in-vehicle terminal 10 having the correct terminal unique key 102, and the authentication succeeds.

When the authentication information verifying section 311 authenticates the received terminal authentication information successfully, the authentication information managing section 312 updates the last authentication timestamp 303 in the in-vehicle terminal management DB 300, using the (A-2) timestamp. Also, when the authentication information verifying section 311 authenticates the received software unique key request information successfully, the authentication information managing section 312 replaces the last authentication timestamp 303, in the in-vehicle terminal management DB 300, with the (B-2) timestamp.

The authentication information generating section 313 generates software unique key authentication information (the information "C") for transmitting the software unique key to the in-vehicle terminal 10 from the server 30.

Specifically, the authentication information generating section 313 acquires the corresponding software unique key, by searching in the software unique key DB 320 in the storage unit 32, using the identification information of the encrypted software. Next, the authentication information generating section 313 generates (C-1) identification information of the encrypted software and (C-2) encrypted information of the identification information of the encrypted software and software unique key encrypted by the cryptographic processing section 314, using a server-side terminal unique key 302 within the in-vehicle terminal management DB 300, as the software unique key authentication information. Then the authentication information generating section 313 transmits the generated software unique key authentication information to the in-vehicle terminal 10 via the communication terminal 20.

Based on the instruction from the software distributing unit 317, the cryptographic processing section 314 encrypts the software stored in the in-vehicle terminal software DB 310, using the software unique key stored in the software unique key DB.

Then, based on the instruction from the authentication information generating section 313, the cryptographic processing section 314 encrypts identification information of the encrypted software and software unique key, using the server-side terminal unique key 302 in the in-vehicle terminal management DB 300. And the cryptographic processing section 314 passes the encrypted information to the authentication information generating section 313.

In addition, the cryptographic processing section 314 performs encryption processing such as SSL/TLS for the information exchanging with the communication terminal 20, via the communication network 40.

Upon receiving an instruction from the authentication information generating section 313, the clock section 315 returns the current timestamp thereto.

The HTTP server processing section 316 generates a URL, based on HTTP, for the communication terminal 20 to obtain the software, and then sends it to the communication terminal 20. Further, the HTTP server processing section 316 receives an access request to the URL from the communication terminal 20.

When the authentication information verifying section 311 authenticates the received software unique key request information (the information "B"), the software distributing section 317 searches for a software program applicable to the in-vehicle terminal 10 in the in-vehicle terminal software DB 310 within the storage section 32, using the terminal identification information 101. Then, the software distributing section 317 generates the encrypted software using the software unique key, via the cryptographic processing section 314.

Further, the software distributing section 317 searches in the software unique key DB 320, for the software unique key to be transmitted to the in-vehicle terminal 10, using the (B-3) identification information of the encrypted software in the software unique key request information as a key.

The communication unit 37 controls the information being transmitted to and from the communication terminal 20, via the communication network 40 such as a mobile communication network and a wireless LAN.

The following description is for the information distribution process implemented by the information distribution system 1 according to the first embodiment of the present invention. This information distribution process includes, for the in-vehicle terminal 10 to obtain the software from the server 30: (1) a terminal authentication process that the terminal identification information 101 of the in-vehicle terminal 10 is transmitted to the server 30, through the communication terminal 20, for authentication; (2) a software acquisition process that the communication terminal 20 obtains the software program applicable to the in-vehicle terminal 10 from the server 30; and (3) a software unique key acquisition process that the in-vehicle terminal 10 obtains the software unique key, via the communication terminal 20, to install the software. The flow of each process will be described in detail as follows.

<Terminal Authentication Process>

Figure 6:
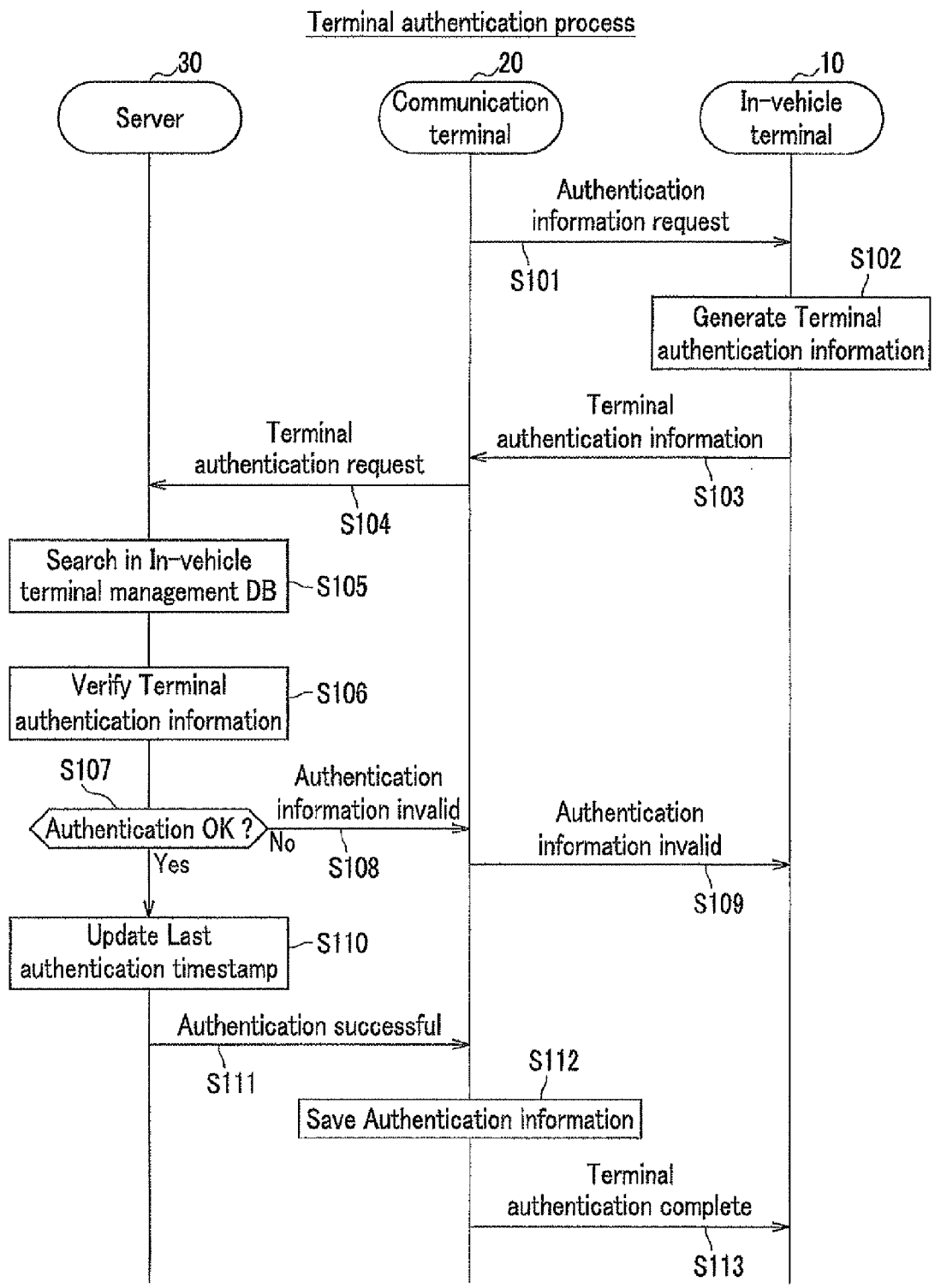
FIG. 6 is a sequence diagram showing a flow of terminal authentication process by an information distribution system according to the first embodiment of the present invention.

FIG. 6 is a sequence diagram showing the flow of terminal authentication process by the information distribution system 1 according to the first embodiment of the present invention. This terminal authentication process is a process in that the terminal authentication information (the information "A") generated by the in-vehicle terminal 10 is to be validated by the server 30 and, if the authentication is successful, the communication terminal 20 saves the terminal authentication information (the information "A").

First, when a terminal authentication start is instructed by user operation or the like for the in-vehicle terminal 10, via the input interface 24 of the communication terminal 20, the in-vehicle terminal authenticating section 211 of the communication terminal 20 transmits an authentication information request message to the in-vehicle terminal 10 for requesting terminal authentication information (the information "A") (Step S101).

Note that the transmission of an authentication information request message may be performed, in addition to user operation, when a software event requiring terminal authentication for the in-vehicle terminal 10 is detected at the communication terminal 20, for example.

Next, upon receiving the authentication information request message, the authentication information generating section 111 in the in-vehicle terminal 10 generates the terminal authentication information (the information "A") (Step S102).

Specifically, the authentication information generating section 111 obtains the terminal identification information 101 from the storage unit 12 and the current timestamp from the clock section 115. And the authentication information generating section 111 passes the (A-1) terminal identification information 101 and the (A-2) timestamp to the cryptographic processing section 114, which encrypts the (A-1) terminal identification information 101 and the (A-2) timestamp with the terminal unique key 102, and passes the encrypted information to the authentication information generating section 111. Then, the authentication information generating section 111 generates terminal authentication information (the information "A"), including the (A-1) terminal identification information 101, the (A-2) timestamp and the (A-3) encrypted information of the terminal identification information and timestamp, both encrypted with the terminal unique key 102.

Subsequently, the authentication information generating section 111 in the in-vehicle terminal 10 transmits the generated terminal authentication information (the information "A") to the communication terminal 20 (Step S103).

Then, the in-vehicle terminal authenticating section 211 in the communication terminal 20 transmits the terminal authentication request message, attached with the received terminal authentication information (the information "A"), to the server 30 (Step S104).

The server 30 searches in the in-vehicle terminal management DB 300 based on the terminal authentication information attached to the terminal authentication request message received from the communication terminal 20 (Step S105).

More specifically, the authentication information verifying section 311 in the server 30 obtains the (A-1) terminal identification information 101, the (A-2) timestamp, and the (A-3) encrypted information of the terminal identification information 101 and timestamp, both encrypted with the terminal unique key 102. Then, the authentication information verifying section 311 searches in the in-vehicle terminal management DB 300, using the key of the (A-1) terminal identification information 101 obtained from the terminal authentication information, for the server-side terminal identification information 301 that matches the (A-1) terminal identification information 101, to obtain the last authentication timestamp 303.

Next, the authentication information verifying section 311 in the server 30 verifies the terminal authentication information (Step S106).

More specifically, the authentication information verifying section 311 compares the obtained (A-2) timestamp value with a value left after subtracting a predetermined threshold value from the last authentication timestamp 303 in the in-vehicle terminal management DB 300. If the timestamp value left after subtracting the predetermined threshold value from the last authentication timestamp 303 is newer than the (A-2) timestamp value, the authentication information verifying section 311 invalidates the information because there is a possibility of unauthorized access such as a replay attack ("No" at Step S107), and transmits an authentication information invalid message indicative of invalid authentication information to the communication terminal 20 (Step S108). Then, the in-vehicle terminal authenticating section 211 in the communication terminal 20 transmits the authentication information invalid message to the in-vehicle terminal 10 and completes the process (Step S109).

On the other hand, if the value obtained by subtracting the predetermined threshold value from the last authentication timestamp 303 is older than the (A-2) timestamp, the authentication information verifying section 311 encrypts the (A-1) terminal identification information 101 and the (A-2) timestamp, with the server-side terminal unique key 302, via the cryptographic processing section 314. If the result of this encryption matches the (A-3) encrypted information, encrypted in the in-vehicle terminal 10, the authentication information verifying section 311 validates the authentication information successfully, determining that the authentication request is from the in-vehicle terminal 10 having the correct terminal unique key 102 ("Yes" at Step S107).

Note that if the result of this encryption does not match the (A-3) encrypted information, encrypted in the in-vehicle terminal 10, the authentication information verifying section 311 invalidates the authentication information, similar to the case for the (A-2) timestamp ("No" at Step S107), and proceeds to S108, S109 for terminating the process.

Subsequently, when the terminal authentication information (the information "A") received at Step S107 is authenticated successfully, the authentication information managing section 312 replaces the last authentication timestamp 303 in the in-vehicle terminal management DB 300 with the (A-2) timestamp obtained by the authentication information verifying section 311 (Step S110).

Then, the authentication information verifying section 311 transmits an authentication success message indicating the successful authentication for the terminal authentication information (the information "A") including the terminal authentication information to the communication terminal 20 (Step S111).

Upon receiving the authentication success message, the in-vehicle terminal authenticating section 211 in the communication terminal 20 obtains the terminal authentication information (the information "A") from the authentication success message and saves it in the storage unit 22 (Step S112). Then, the in-vehicle terminal authenticating section 211 in the communication terminal 20 transmits a terminal authentication completion message, indicating completion of the terminal authentication process, to the in-vehicle terminal 10 (Step S113).

<Software Acquisition Process>

Described next is the software acquisition process that the communication terminal 20 acquires a software program applicable to the in-vehicle terminal 10 from the server 30.

Figure 7:
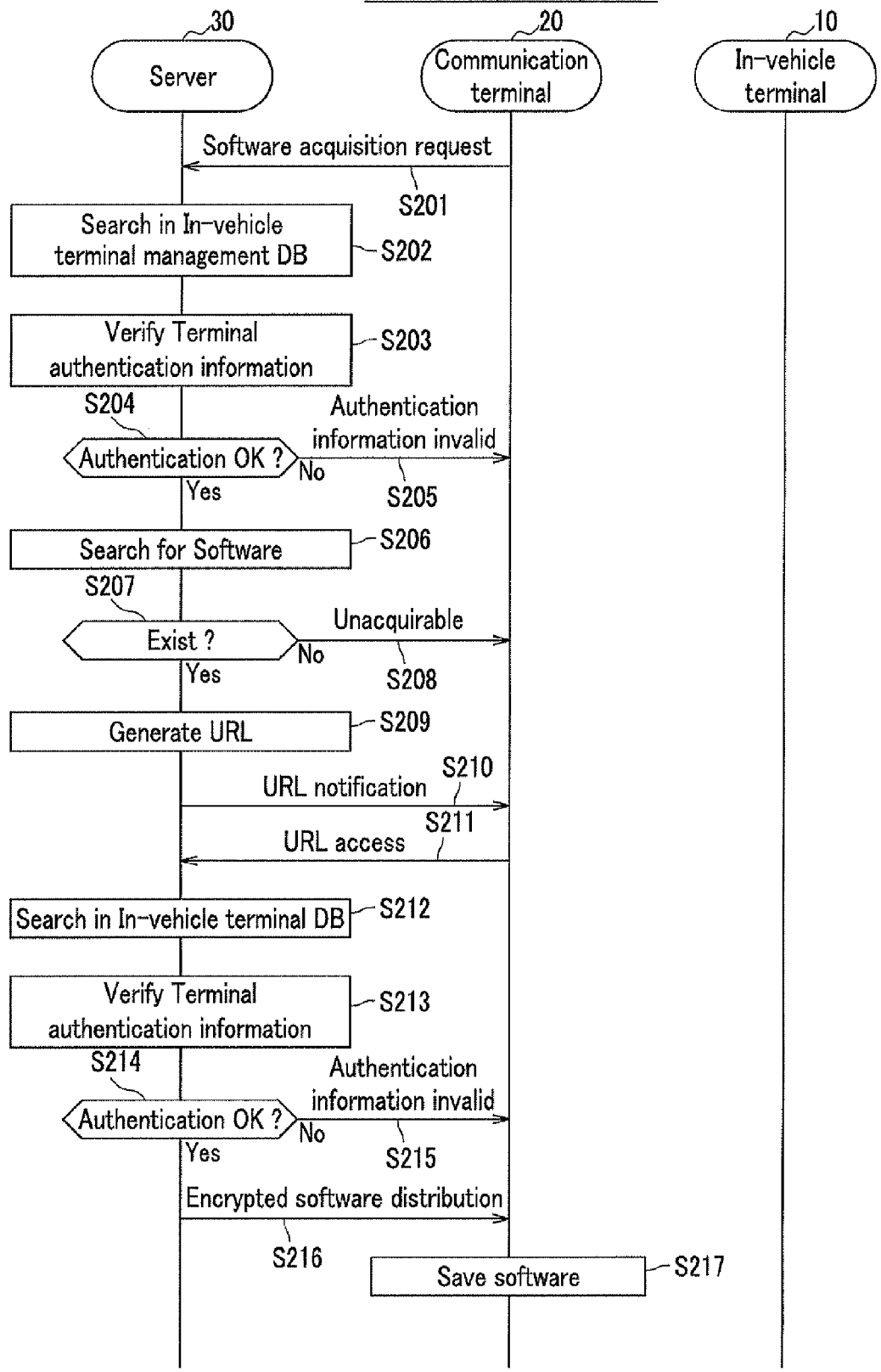
FIG. 7 is a sequence diagram showing a flow of software acquisition process by an information distribution system according to the first embodiment of the present invention.

FIG. 7 is a sequence diagram showing the flow of the software acquisition process performed by the information distribution system 1 according to the first embodiment of the present invention.

First, when the start of the software acquisition process is instructed by user operation, via the input interface 24 of the communication terminal 20, the software acquiring section 212 of the communication terminal 20 generate a software acquisition request message, attached with the terminal authentication information (the information "A") stored in the storage unit 22 at Step S112 in FIG. 6, for transmission to the server 30 (Step S201).

Note that the transmission of software acquisition request message may be performed when detecting a software event that requires the software acquisition for the in-vehicle terminal 10, at the communication terminal 20, for example, in addition to user operation.

Then, in the server 30, the authentication information verifying section 311 obtains the terminal authentication information (the information "A") included in the software acquisition request message, and performs a search in the in-vehicle terminal management DB 300 (Step S202), verification of the terminal authentication information (Step S203), and determination of the verification result ("Authentication OK?") (Step S204). Since the processes at Steps S202 through S204 are same as those at Steps S105 through S107 in the FIG. 6 described above, the description will be omitted.

If the authentication for the terminal authentication information (the information "A") is unsuccessful at Step S204 ("No" at Step S204), the authentication information verifying section 311 sends an authentication information invalid message indicative of unsuccessful authentication to the communication terminal 20, thereafter ending the process in the server 30 (Step S205).

On the other hand, if the authentication for the terminal authentication information (the information "A") is successful at Step S204 ("Yes" at Step S204), the authentication information verifying section 311 proceeds to Step S206.

At Step S206, the software distributing section 317 searches for a software program applicable to the in-vehicle terminal 10 in the in-vehicle terminal software DB 310 within the storage unit 32, using the (A-1) terminal identification information 101 of the terminal authentication information (the information "A") as a key.

When the search result is that the software program applicable to the in-vehicle terminal 10 does not exist ("No" at Step S207), the software distributing section 317 sends an unacquirable message indicating inability to acquire the software to the communication terminal 20, thereafter ending the process in the server 30 (Step S208).

On the other hand, when the search is successful for the software program applicable to the in-vehicle terminal 10, in other words the software program exists ("Yes" at Step S207), the software distributing section 317 continues process by proceeding to Step S209.

At Step S209, the software distributing section 317 generates a URL for the communication terminal 20 to download the searched software, via the HTTP server processing section 316. Then, the software distributing section 317 notifies the communication terminal 20 of the URL (Step S210).

Upon receiving the URL, the software acquiring section 212 of the communication terminal 20 accesses the URL to download, via the HTTP client processing section 215, by attaching the terminal authentication information (the information "A") (Step S211).

Subsequently, the authentication information verifying section 311 in the server 30 performs a search in the in-vehicle terminal management DB 300 for the obtained terminal authentication information (the information "A") (Step S212), verification of the terminal authentication information (Step S213), and determination of the verification result ("Authentication OK?") (Step S214). Note that the description will be omitted for the process of Steps S212 through S214, as being same as the process of Steps S105 through S107 in FIG. 6 described above, If the authentication for the terminal authentication information (the information "A") is unsuccessful at Step S214 ("No" at Step S214), the authentication information verifying section 311 sends an authentication information invalid message, indicative of unsuccessful authentication, to the communication terminal 20, for ending the process in the server 30 (Step S215).

On the other hand, if the authentication for the terminal authentication information (the information "A") is successful at Step S214 ("Yes" at Step S214), the software distributing section 317 transmits the software, encrypted with software unique key via the cryptographic processing section 314 (encrypted software), to the communication terminal 20 (Step S216). Note that the encrypted software is attached, by the software distributing section 317, with the identification information of the encrypted software to be used in the process described later, for transmitting to the communication terminal 20.

The communication terminal 20 saves the received encrypted software in the storage unit 22 (Step S217).

<Software Unique Key Acquisition Process>

Described next will be the process for the in-vehicle terminal 10 to obtain a software unique key through the communication terminal 20, and install the software (software unique key acquisition process).

Figure 8:
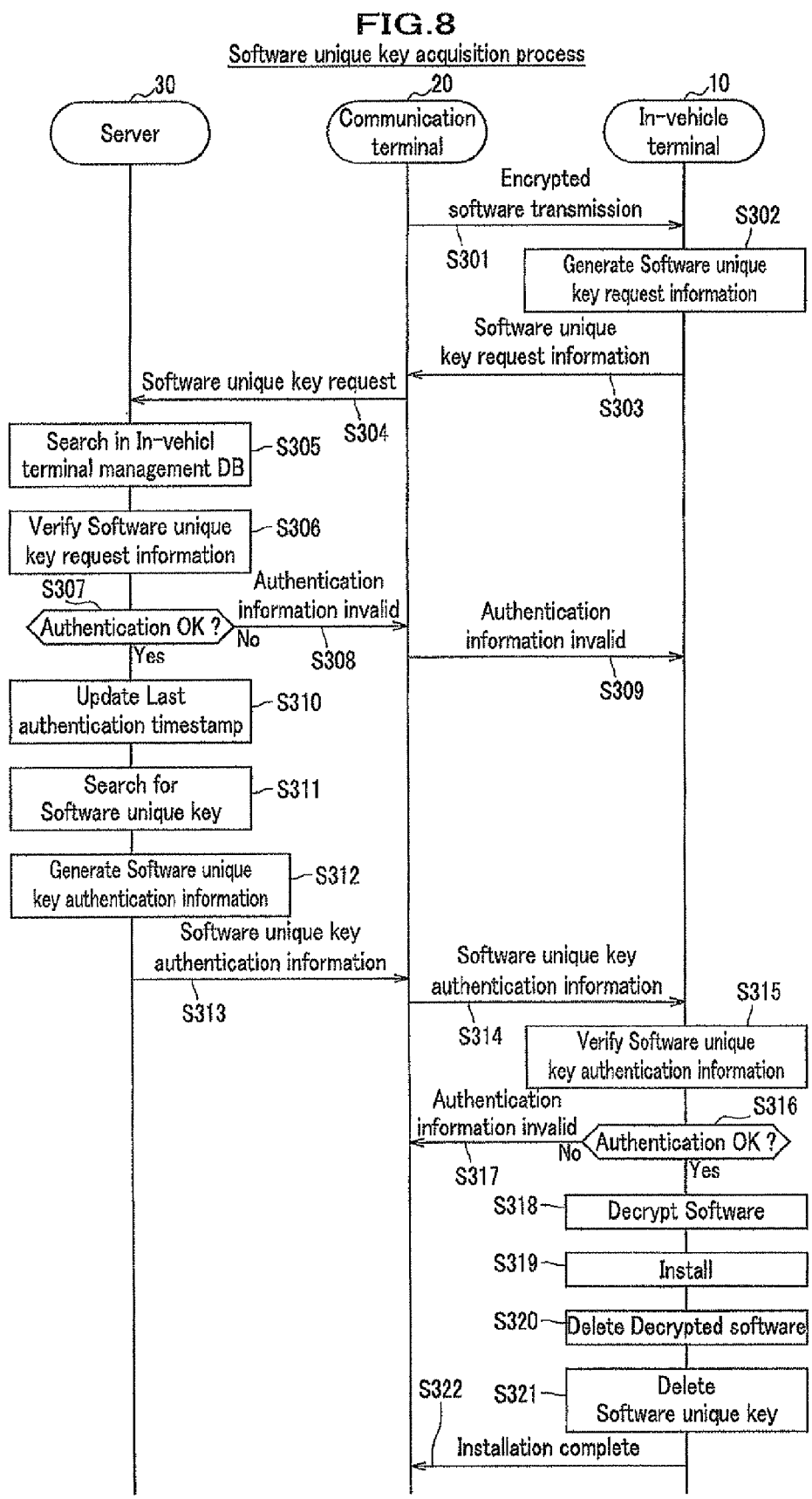
FIG. 8 is a sequence diagram showing a flow of a software unique key acquisition process by an information distribution system according to the first embodiment of the present invention.

FIG. 8 is a sequence diagram showing the flow of the software unique key acquisition process of the information distribution system 1 according to the first embodiment of the present invention.

First, when the start of the software program installation to the in-vehicle terminal 10 is instructed by user operation via the input interface 24 of the communication terminal 20, the software transmitting section 213 of the communication terminal 20 transmits the encrypted software saved in the storage unit 22 at Step S217 in FIG. 7 to the in-vehicle terminal 10 (Step S301).

Note that the transmission of the encrypted software program may be performed when detecting a software event that requires the transmission of the encrypted software to the in-vehicle terminal 10, at the communication terminal 20, for example, in addition to user operation.

Next, upon receiving the encrypted software, the installation processing section 113 of the in-vehicle terminal 10 saves the encrypted software in the storage unit 12. Then, the authentication information generating section 111 generates the software unique key request information (the information "B") (Step S302).

More specifically, the authentication information generating section 111 retrieves the terminal identification information 101 from the storage unit 12, obtains the current timestamp from the clock section 115, and retrieves the identification information of the encrypted software saved in the storage unit 12. Then, the authentication information generating section 111 passes the (B-1) terminal identification information 101, the (B-2) timestamp and the (B-3) identification information of the encrypted software to the cryptographic processing section 114, which in turn encrypts the (B-1) terminal identification information 101, the (B-2) timestamp and the (B-3) identification information of the encrypted software, using the terminal unique key 102, and then passes the encrypted information to the authentication information generating section 111. Then, the authentication information generating section 111 generates the software unique key request information (the information "B"), including the (B-1) terminal identification information 101, the (B-2) timestamp, the (B-3) identification information of the encrypted software, and the (B-4) encrypted information of the terminal identification information 101, the timestamp, and the identification information of the encrypted software, all encrypted with the terminal unique key 102.

Subsequently, the installation processing section 113 transmits the software unique key request information (the information "B") generated by the authentication information generating section 111 to the communication terminal 20 (Step S303).

And the software transmitting section 213 of the communication terminal 20 sends the software unique key request message including the software unique key request information (the information "B") to the server 30 (Step S304).

The server 30 searches in the in-vehicle terminal management DB 300, based on the software unique key request information (the information "B") included in the software unique key request message received from the communication terminal 20 (Step S305).

More specifically, the authentication information verifying section 311 in the server 30 obtains the (B-1) terminal identification information 101, the (B-2) timestamp, the (B-3) identification information of the encrypted software, and the (B-4) encrypted information of the terminal identification information 101, the timestamp, and the identification information of the encrypted software, all encrypted with the terminal unique key 102 from the software unique key request information. Then, the authentication information verifying section 311 searches in the in-vehicle terminal management DB 300, using the (B-1) terminal identification information obtained from the software unique key request information as the key, for the server-side terminal identification information 301 that matches the (B-1) terminal identification information 101, and then obtains the last authentication timestamp 303 thereof.

Next, the authentication information verifying section 311 in the server 30 verifies the software unique key request information (Step S306).

More specifically, the authentication information verifying section 311 compares the obtained (B-2) timestamp with the value obtained by subtracting the predetermined threshold value from the last authentication timestamp 303 in the in-vehicle terminal management DB 300. And, if he value obtained by subtracting the predetermined threshold value from the last authentication timestamp 303 is newer than the (B-2) timestamp, the authentication information verifying section 311 determines that the authentication is unsuccessful, because there is a possibility of unauthorized access such as a replay attack ("No" at Step S307), and transmits the authentication information invalid message, indicative of unsuccessful authentication, to the communication terminal 20 (Step S308). Then, the software transmitting section 213 in the communication terminal 20 sends the authentication information invalid message to the in-vehicle terminal 10, for ending the process in the communication terminal 20 (Step S309).

On the other hand, if the value obtained by subtracting the predetermined threshold value from the last authentication timestamp 303 is older than the (B-2) timestamp, the authentication information verifying section 311 encrypts the (B-1) terminal identification information 101, the (B-2) timestamp, and the (B-3) identification information of the encrypted software in the software unique key request information, with the server-side terminal unique key 302, via the cryptographic processing section 314. Then, when the result of this encryption matches the (B-4) encrypted information, encrypted in the in-vehicle terminal 10, the authentication information verifying section 311 determines that the authentication request is from the in-vehicle terminal 10 having the correct terminal unique key 102, and validates the authentication as successful ("Yes" at Step S307).

In addition, when the result of this encryption does not match the (B-4) encrypted information, encrypted in the in-vehicle terminal 10, the authentication information verifying section 311 determines that the authentication is unsuccessful ("No" at Step S307), as in the above case for the determination using the (B-2) timestamp, and proceeds to Steps S308 and S309, for ending the process in the server 30.

Subsequently, if the authentication for the software unique key request information (the information "B") is successful at Step S307, the authentication information managing section 312 replaces the last authentication timestamp 303 in the in-vehicle terminal management DB 300 with the (B-2) timestamp obtained by the authentication information verifying section 311 (Step S310).

Next, the software distributing section 317 searches in the software unique key DB 320 for the software unique key to be sent to the in-vehicle terminal 10, using the (B-3) identification information of the encrypted software in the software unique key request information as a key (Step S311).

Then, the authentication information generating section 313 generates the software unique key authentication information (the information "C") that is the information for transmitting the software unique key to the in-vehicle terminal 10 from the server 30 (Step S312).

More specifically, the authentication information generating section 313 generates the software unique key authentication information that includes (C-1) identification information of the encrypted software and (C-2) encrypted information of the identification information of the encrypted software and the software unique key searched at Step S311, both encrypted with the server-side terminal unique key 302 in the in-vehicle terminal management DB 300, via the cryptographic processing section 314. Then, the authentication information generating section 313 transmits the software unique key authentication information (the information "C") to the communication terminal 20 (Step S313).

Upon receipt of the software unique key authentication information, the software transmitting section 213 in the communication terminal 20 transmits the software unique key authentication information to the in-vehicle terminal 10 (Step S314).

Note that it is impossible for the communication terminal 20 to decrypt the encrypted software with the software unique key, because the software unique key is encrypted with the server-side terminal unique key 302 that is unknown to the communication terminal 20.

Next, the in-vehicle terminal 10 validates the software unique key authentication information (the information "C") received from the communication terminal 20 (Step S315).

More specifically, the authentication information verifying section 112 in the in-vehicle terminal 10 decrypts the (C-2) encrypted information in the software unique key authentication information, with the terminal unique key 102 saved in its own storage unit 12, and then verifies whether or not the decrypted identification information of the encrypted software matches the (C-1) identification information of the encrypted software in the software unique key authentication information. If it does not match, the authentication information verifying section 112 determines that the software unique key authentication information is tampered and the authentication is unsuccessful ("No" at Step S316), sends the authentication information invalid message, indicative of unsuccessful authentication, to the communication terminal 20, for ending the process in the in-vehicle terminal 10 (Step S317). On the other hand, if it matches ("Yes" at Step S316), the authentication information verifying section 112 determines that the authentication is successful, and decrypts the encrypted software stored in the storage unit 12, with the software unique key obtained at the same time when decrypting (C-2) above (Step S318).

Subsequently, the installation processing section 113 installs the software decrypted by the authentication information verifying section 112 (Step S319). After the installation is complete, the installation processing section 113 deletes the decrypted software (Step S320) and the software unique key (Step S321). This is because the encrypted software and the software unique key are not required after the installation is complete, then to be deleted from the in-vehicle terminal 10 to reduce the risk of leakage.

Then, the installation processing section 113 sends an installation completion message to the communication terminal 20, for ending the process (Step S322).

<Screen Display>

The following describes an example of a screen transition of the in-vehicle terminal 10 and the communication terminal 20 according to the first embodiment of the present invention. Hereinafter, a screen display of the display 13 controlled by the image processing section 116 of the in-vehicle terminal 10, and a screen display of the display 23 controlled by the image processing section 216 of the communication terminal 20 will be described so as to correspond to the (1) terminal authentication process, the (2) software acquisition process and the (3) software unique key acquisition process, described above.

(Screen Display for Terminal Authentication Process)

Figure 9:
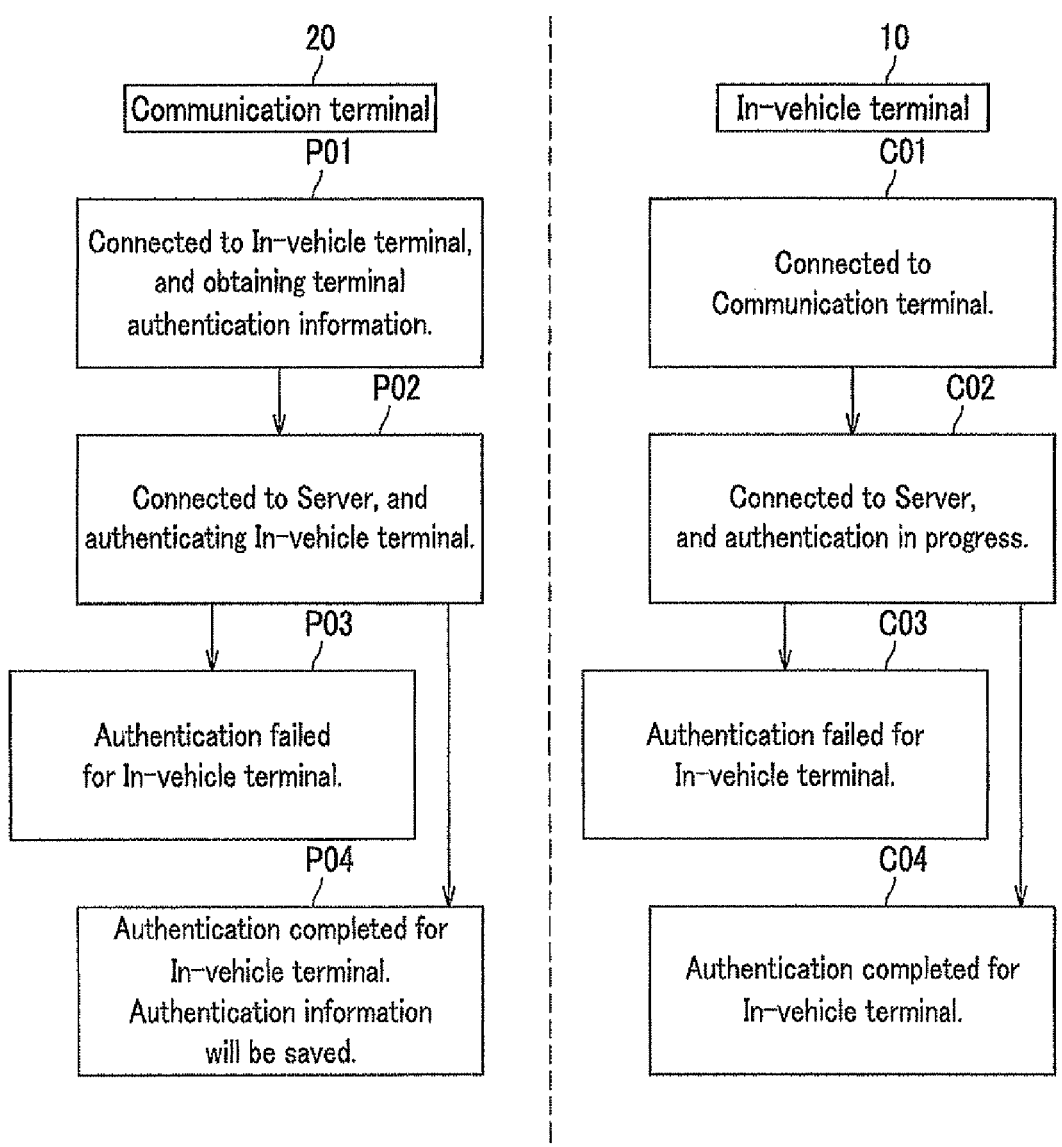
FIG. 9 is a diagram showing an example of screen display of an in-vehicle terminal and a communication terminal, respectively, during a terminal authentication process according to the first embodiment of the present invention.

FIG. 9 is a diagram showing an example of a screen display during the terminal authentication process of the in-vehicle terminal 10 and the communication terminal 20 according to the first embodiment of the present invention.

During the terminal authentication process in FIG. 6, the image processing section 116 of the in-vehicle terminal 10 and the image processing section 216 of the communication terminal 20 display screens shown in FIG. 9 at each of steps.

In the terminal authentication process in FIG. 6, the in-vehicle terminal 10 displays a screen C01 "Connected to communication terminal", from Step S101 to receive the authentication information request message received from the communication terminal 20 up to Step S102 to generate the terminal authentication information (the information "A").

Then, the in-vehicle terminal 10 displays a screen C02 "Connected to server, and authentication in progress" after Step S103 to transmit the terminal authentication information to the communication terminal 20. When receiving the authentication information invalid message at Step S109, the in-vehicle terminal 10 displays a screen C03 "Authentication failed for In-vehicle terminal". In addition, when receiving a terminal authentication completion message at Step S113, the in-vehicle terminal 10 displays a screen C04 "Authentication completed for In-vehicle terminal".

On the other hand, in the terminal authentication information process in FIG. 6, the communication terminal 20 displays a screen P01 "Connected to In-vehicle terminal, and obtaining terminal authentication information", from Step S101 to transmit the authentication information request message to the in-vehicle terminal 10 up to Step S103 to receive the terminal authentication information (the information "A").

Subsequently, the communication terminal 20 displays a screen P02 "Connected to Server, and authenticating In-vehicle terminal" after Step S104 to send the terminal authentication request message to the server 30. Then, when receiving the authentication information invalid message at Step S108, the communication terminal 20 displays a screen P03 "Authentication failed for In-vehicle terminal". Further, when receiving the authentication success message at Step S111, the communication terminal 20 display a screen P04 "Authentication completed for In-vehicle terminal. Authentication information will be saved."

(Screen Display for Software Acquisition Process)

The following describes the screen display at the communication terminal 20 during the software acquisition process.

Figure 10:
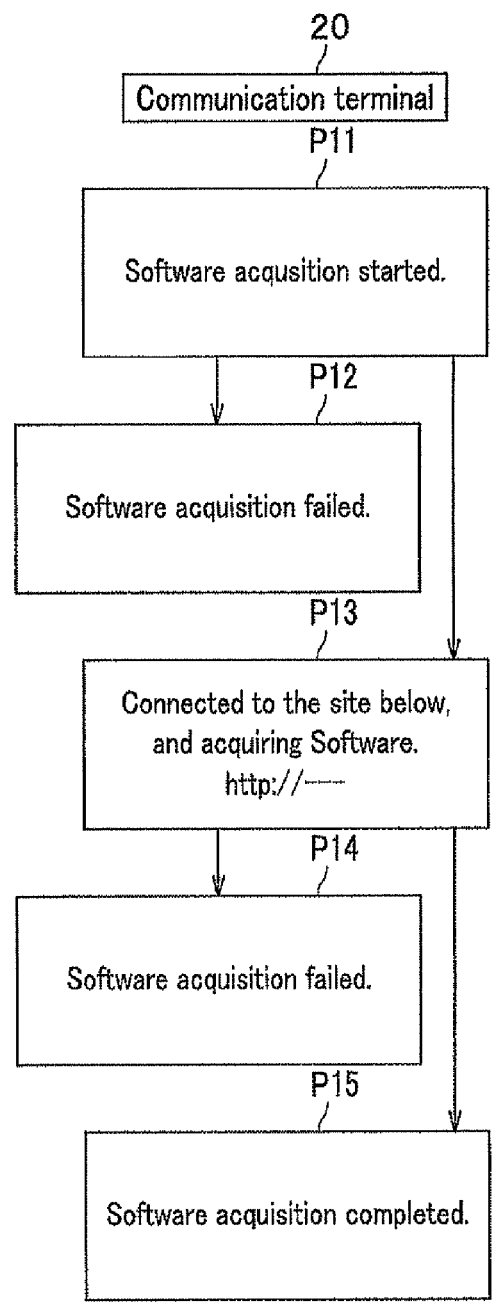
FIG. 10 is a diagram showing an example of screen display of a communication terminal during software acquisition process according to the first embodiment of the present invention.

FIG. 10 is a diagram showing an example of a screen display at the communication terminal 20 during the software acquisition process according to the first embodiment of the present invention.

During the software acquisition process in FIG. 7, the image processing section 216 of the communication terminal 20 displays screens shown in FIG. 10 at each of steps.

In the software acquisition process in FIG. 7, after transmitting the software acquisition request message at Step S201, the communication terminal 20 displays a screen P11 "Software acquisition started". Then, when receiving the authentication information invalid message at Step S205, and when receiving an unacquirable message at Step S208, the communication terminal 20 displays a screen P12 "Software acquisition failed".

Subsequently, the communication terminal 20 receives a URL from the server 30, and access the URL at Step S211, displaying a screen P13 "Connected to the site below, and acquiring software. http:// - - -". Then, when receiving the authentication information invalid message at Step S215, the communication terminal 20 displays a screen P14 "Software acquisition failed". Also, when receiving the encrypted software from the server 30 at Step S216 and finishing to save the encrypted software in storage unit 22 at Step S217, the communication terminal 20 displays a screen P15 "Software acquisition completed".

(Screen Display for Software Unique Key Acquisition Process)

The following describes the screen display of the in-vehicle terminal 10 and the communication terminal 20 during the software unique key acquisition process.

Figure 11:
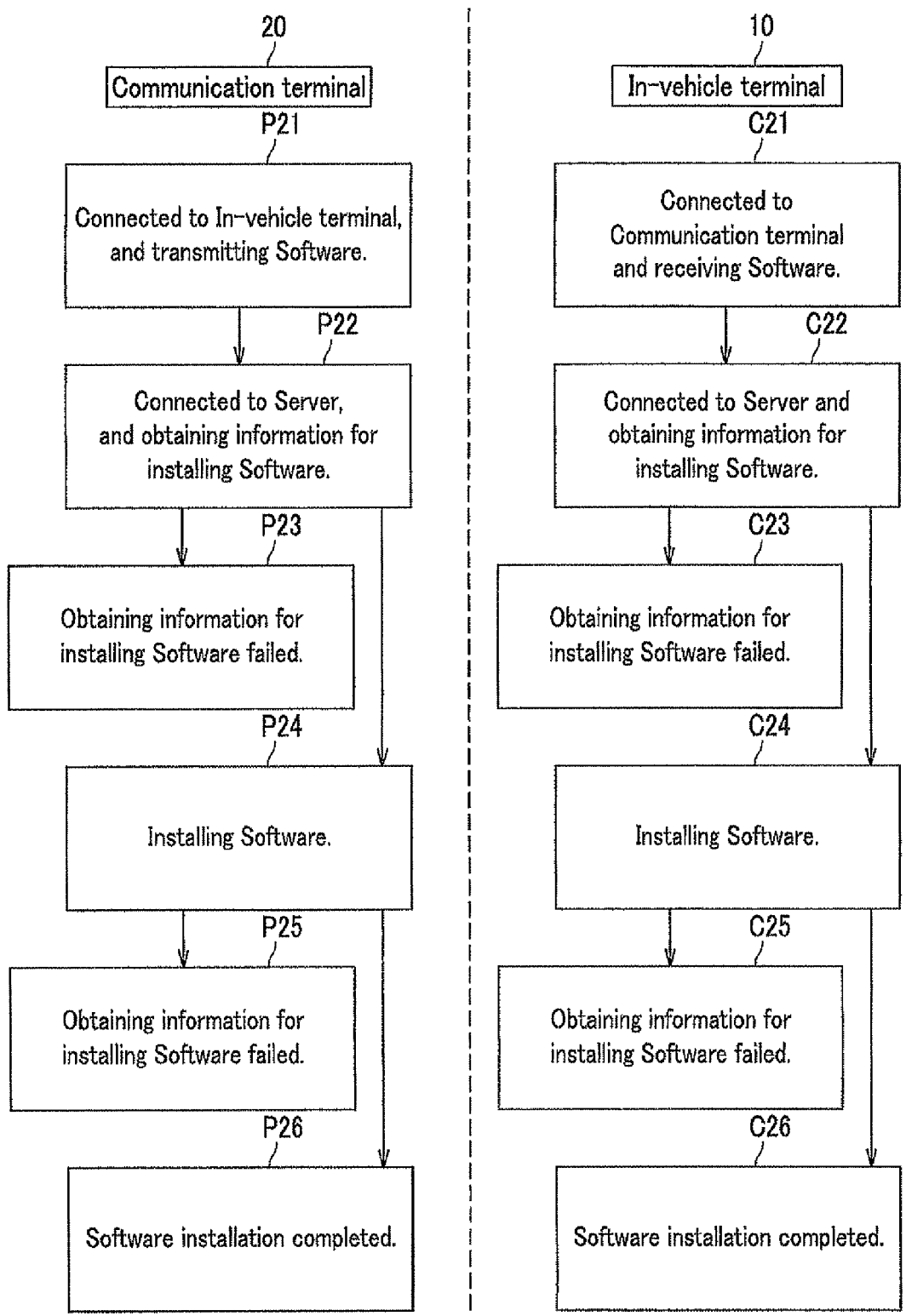
FIG. 11 is a diagram showing an example of screen display of an in-vehicle terminal and a communication terminal, respectively, during software unique key acquisition process according to the first embodiment of the present invention.

FIG. 11 is an illustration showing an example of a screen display at the in-vehicle terminal 10 and the communication terminal 20 during the software unique key acquisition process according to the first embodiment of the present invention.

During the software unique key acquisition process in FIG. 8, the image processing section 116 of the in-vehicle terminal 10 and the image processing section 216 of the communication terminal 20 display screens shown in FIG. 11 at each of steps.

In the software unique key acquisition process in FIG. 8, the in-vehicle terminal 10 displays a screen C21 "Connected to communication terminal and receiving software", when receiving the encrypted software from the communication terminal 20 at Step S301. Then, after transmitting software unique key request information (the information "B") to the communication terminal 20 at Step S303, the in-vehicle terminal 10 displays a screen C22 "Connected to Server and obtaining information for installing software". Later, when receiving the authentication information invalid message at Step S309, the in-vehicle terminal 10 displays a screen C23 "Obtaining information for installing software failed".

Upon receipt of the software unique key authentication information (the information "C") at Step S314, the in-vehicle terminal 10 displays a screen C24 "Installing software". When the verification of the software unique key authentication information is unsuccessful ("No" at Step S316), the in-vehicle terminal 10 displays a screen C25 "Obtaining information for installing software failed". On the other hand, when the verification of the software unique key authentication information is successful ("Yes" at Step S316) and software installation is completed (Step S319), the in-vehicle terminal 10 displays a screen C26 "Software installation completed".

On the other hand, the communication terminal 20 displays a screen P21 "Connected to In-vehicle terminal, and transmitting software", from Step S301 to transmit the encrypted software to the in-vehicle terminal 10 to Step S303 to receive the software unique key request information (the information "B") in the software unique key acquisition process in FIG. 8.

Subsequently, the communication terminal 20 displays a screen P22 "Connected to Server and obtaining information for installing software", after Step S304 to transmit the software unique key request message to the server 30. Then, when receiving the authentication information invalid message at Step S308, the communication terminal 20 displays a screen P23 "Obtaining information for installing software failed". In addition, when receiving the software unique key authentication information (information "C") at Step S313 and transmitting the software unique key authentication information to the in-vehicle terminal 10 (Step S314), the communication terminal 20 displays a screen P24 "Installing software".

When receiving the authentication information invalid message at Step S317, the communication terminal 20 displays a screen P25 "Obtaining information for installing software failed". On the other hand, when receiving the installation complete message, the communication terminal 20 displays a screen P26 "Software installation completed".

Note that an example was described above for transition of the display screens for each process, but the in-vehicle terminal 10 may provide the processing contents to be displayed on the screen to the user as audio information, through the speaker 15 by the audio processing section 118. Also, the communication terminal 20 may provide the processing contents to be displayed on the screen to the user as audio information, through the speaker 25 by the audio processing section 218.

As described above, the information distribution method, the information distribution system 1 and the in-vehicle terminal 10, according to the first embodiment of the present invention, are capable to reduce the time and efforts for data input and software download, which are required in the prior art to obtain the terminal identification information 101 in advance from the in-vehicle terminal 10, enter the information to a PC, a mobile phone or the like, and insert removable media to the in-vehicle terminal 10 for installing the software. In addition, the software is encrypted then transmitted to the in-vehicle terminal 10 from the server 30, as well as the software unique key for decrypting the encrypted software. Thus, it is impossible to decrypt the encrypted software in the communication terminal 20, preventing the software to be installed to other in-vehicle terminals not to be meant for distribution.

Second Embodiment

Next, a description will be given for an information distribution system 1 according to a second embodiment of the present invention. The information distribution system 1 according to the second embodiment of the present invention is an example for a plurality of in-vehicle terminals 10 to obtain the software from the server 30 via the same communication terminal 20.

As an assumption of the processing by the information distribution system 1 according to the second embodiment of the present invention, the terminal authentication process in FIG. 6 and the software acquisition process in FIG. 7 according to the first embodiment of the present invention are already performed for the first in-vehicle terminal 10, using the terminal authentication information (the information "A"). In this state, the information distribution system 1 according to the second embodiment of the present invention implements the software installation processing to a second in-vehicle terminal 10 that is different from the first in-vehicle terminal 10.

The actual situation that the processing by the information distribution system 1 according to the second embodiment of the present invention is implemented is, for example, when a single family owns a plurality of cars and a user wants to install the software from the server 30 in each in-vehicle terminal 10 of the plurality of cars. The information distribution system 1 according to the second embodiment the present invention aims to eliminate the need for repeating the entire process from the beginning of the terminal authentication for each in-vehicle terminal 10 of the second and beyond, and reduce time and efforts for data input and software download when installing software in the in-vehicle terminal 10 thereof.

The overall configuration of the information distribution system 1 according to the second embodiment of the present invention is the same as the information distribution system 1 according to the first embodiment of the present invention shown in FIG. 1. However, the in-vehicle terminal 10 is the second one, connected with the communication terminal 20, to which the user wants to install the software next, in place of the first in-vehicle terminal 10 for which the software installation was already finished by the information distribution processing shown in the first embodiment of the present invention.

The configuration of each unit of the information distribution system 1 according to the second embodiment of the present invention is the same as the configuration of each unit according to the first embodiment of the present invention shown in FIG. 2 through 4. However, the software distributing section 317 in the server 30 (see FIG. 4) and the software acquiring section 212 in the communication terminal 20 (see FIG. 3) are provided with following features, in addition to the features of the first embodiment.

Upon receipt of the software unique key request information (the information "B") from the authentication information verifying section 311, the software distributing section 317 in the server 30 determines, by using the (B-1) terminal identification information and the (B-3) identification information of the encrypted software in the software unique key request information, whether or not the software specified in the identification information of the encrypted software may be installed in the in-vehicle terminal 10 that transmitted a software unique key request information, that is, whether or not the software is applicable to the sort of the in-vehicle terminal 10, representing the type, the version or the like ("Verify Software applicability": Step S401 in FIG. 12 to be described later).

In particular, the software distributing section 317 determines the sort of the in-vehicle terminal 10 using the (B-1) terminal identification information 101, and then determines whether or not the software specified by the (B-3) identification information of the encrypted software is applicable to the determined sort.

If the software is not applicable to the sort of the in-vehicle terminal 10, the software distributing section 317 selects the applicable software using the (B-1) terminal identification information 101 and the (B-3) identification information of the encrypted software, and then transmits its URL and the software unique key request information (the information "B") to the communication terminal 20.

Figure 13:
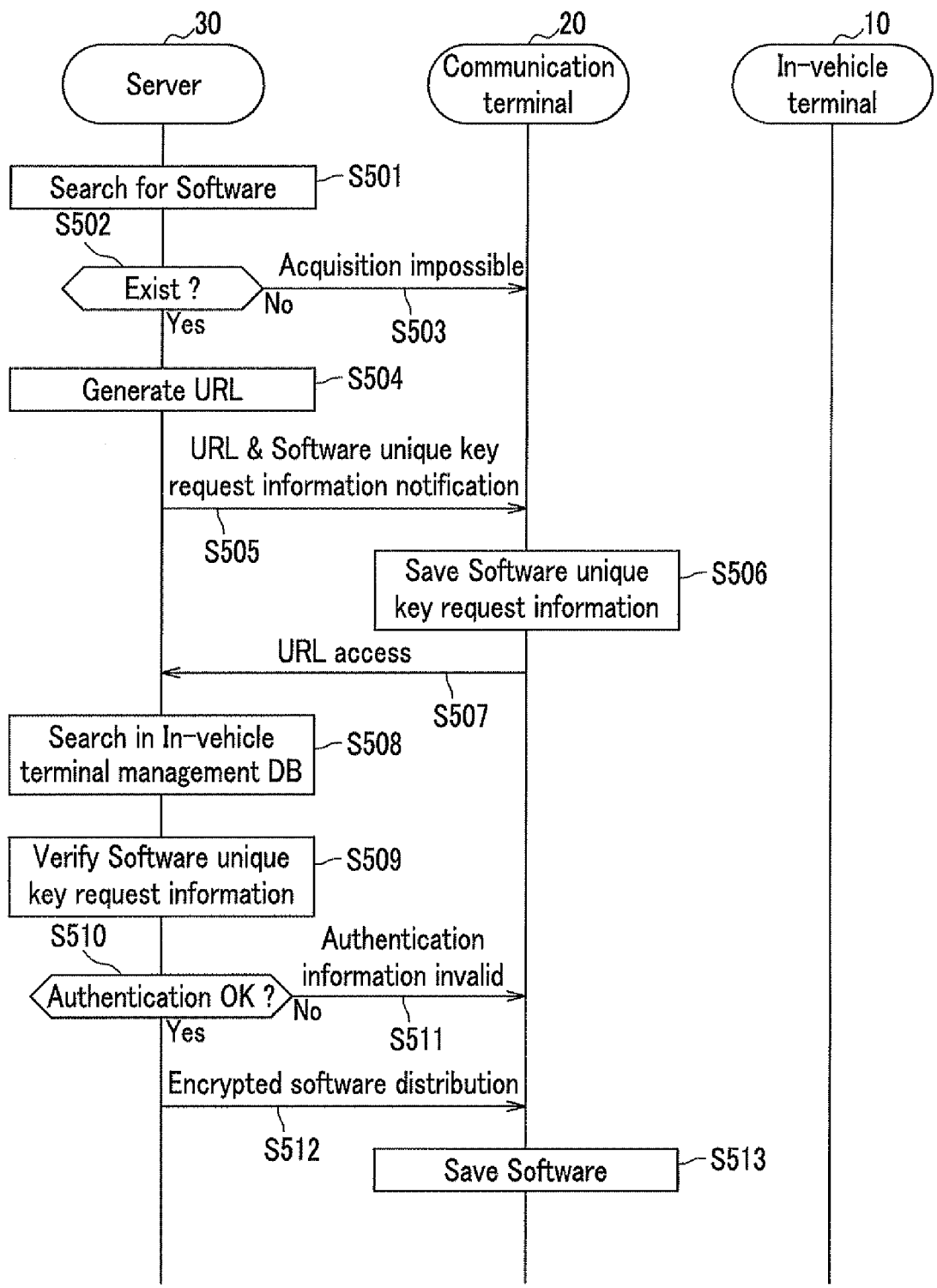
FIG. 13 is a sequence diagram showing a flow of software re-distribution process according to the second embodiment of the present invention.

Upon receiving the URL for acquiring the applicable software program and the software unique key request information (the information "B"), the software acquiring section 212 of the communication terminal 20 saves the software unique key request information in the storage unit 22 and accesses the destination URL to be downloaded therefrom, by adding the software unique key request information (the information "B"), through the HTTP client processing section 215 (Step S505 through S507 in FIG. 13 to be described later).

Next, the process in the communication terminal 20 and the server 30 will be described when the software unique key request information (the information "B") is transmitted from the second in-vehicle terminal 10.

Figure 12:
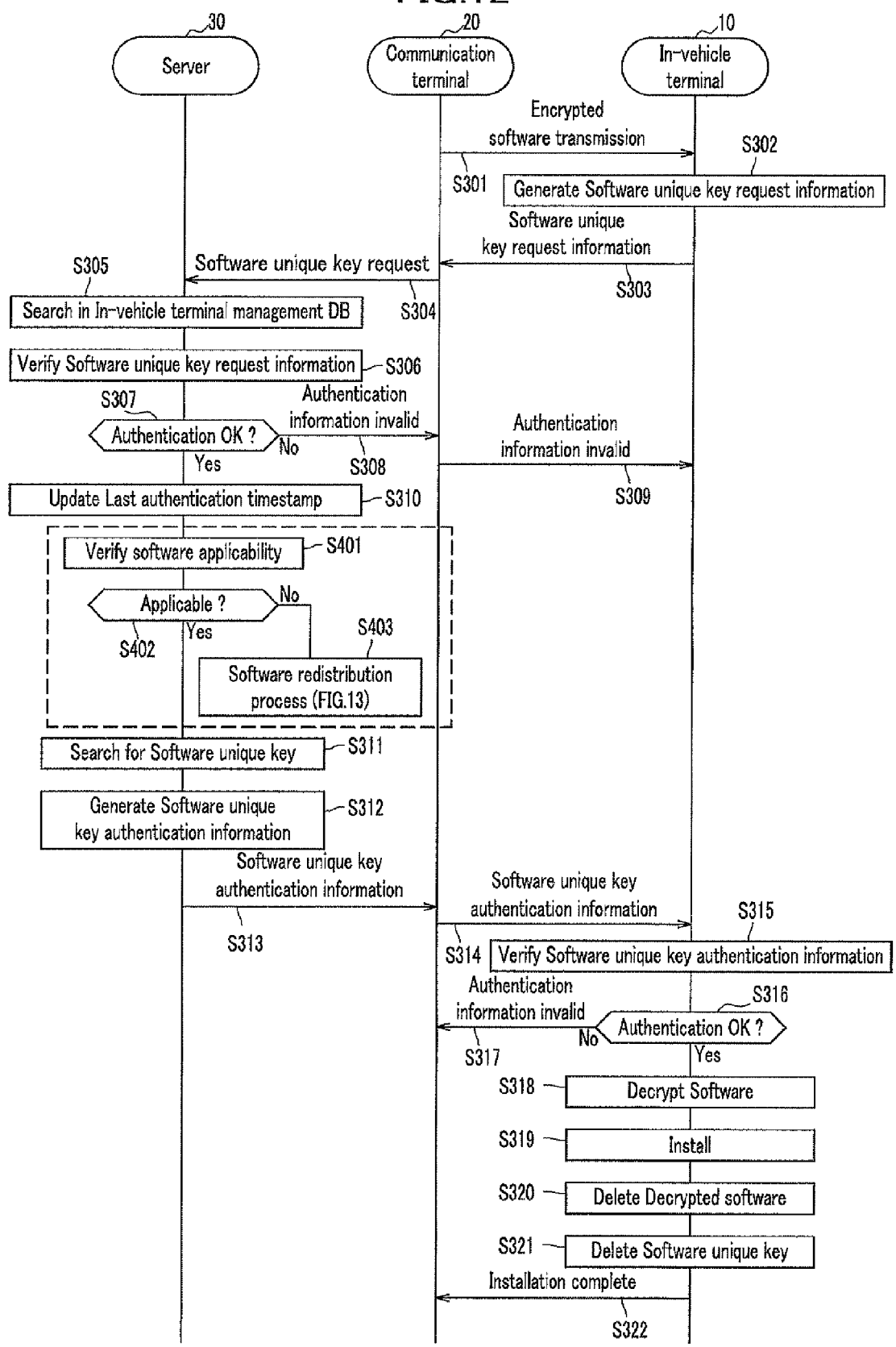
FIG. 12 is a sequence diagram showing a flow of processing when a server, according to the second embodiment of the present invention, receives request information for a software unique key from a second in-vehicle terminal, via a communication terminal.

FIG. 12 is a sequence diagram showing the process flow when the server 30 according to the second embodiment of the present invention receives the software unique key request information from the second in-vehicle terminal 10, via the communication terminal 20.

Here, it is assumed that the software applicable to the first in-vehicle terminal 10 is stored in the communication terminal 20 at Step S217 in FIG. 7.

As shown in FIG. 12, the processes from the transmission of the encrypted software at Step S301 until the update of the last authentication timestamp 303 at Step S310 are the same as the software unique key acquisition process shown in FIG. 8, thereby omitting the description. Note that the (B-3) identification information of the encrypted software in the software unique key request information (the information "B"), generated by the authentication information generating section 111 in the second in-vehicle terminal 10 at Step S302 in FIG. 12, is assigned with the identification information of the encrypted software corresponding to the software program applicable to the first in-vehicle terminal 10.

At Step S401, the software distributing section 317 determines whether or not the software program is applicable to the sort of the in-vehicle terminal 10, representing the type, the version or the like, using the (B-1) terminal identification information 101 and the (B-3) identification information of the encrypted software in the software unique key request information generated by the second in-vehicle terminal 10 (Verify Software applicability). In other words, a determination is executed whether or not the sort of the first in-vehicle terminal 10 is same as the sort of the second in-vehicle terminal 10 so that the software installed in the first in-vehicle terminal 10 is applicable to the second in-vehicle terminal 10 as it is.

In particular, the software distributing section 317 identifies the sort of the second in-vehicle terminal 10, using the (B-1) terminal identification information 101 and determines whether or not the software specified in the (B-3) identification information of the encrypted software is applicable to the identified sort of the second in-vehicle terminal.

If the software program is not applicable to the sort of the second in-vehicle terminal 10 ("No" at Step S402), the software distributing section 317 proceeds to a Software redistribution process (Step S403) (details will be described later, referring to FIG. 13). On the other hand, if the software program is applicable to the sort of the second in-vehicle terminal 10 ("Yes" at Step S402), the software distributing section 317 proceeds to Step 311 and further to search for the software unique key, in the same way as FIG. 8, then transmits the software unique key authentication information (the information "C") to the second in-vehicle terminal 10, for software installation therein.

In this way, the software may be installable without taking time and efforts for newly inputting an authentication information of the second in-vehicle terminal 10, even for the software unique key acquisition request from the second in-vehicle terminal 10, if the second in-vehicle terminal 10 is of the same sort as the first in-vehicle terminal hence the same software is applicable.

The following describes the software redistribution process when the software already available for installation is not applicable to the sort of the second in-vehicle terminal 10 ("No" at Step S402).

FIG. 13 is a sequence diagram showing the flow of the software redistribution process according to the second embodiment of the present invention.

First, if the software is not applicable to the sort of the second in-vehicle terminal 10 ("No" at Step S402 in FIG. 12), the software distributing section 317 in the server 30 searches in the in-vehicle terminal software DB 310 for an alternative software available for the second in-vehicle terminal 10 that is requesting the software unique key, using the (B-1) terminal identification information 101 and the (B-3) identification information of the encrypted software in the software unique key request information (the information "B") (Step S501).

As a result, if there is no software program applicable to the second in-vehicle terminal 10 ("No" at Step S502), the software distributing section 317 transmits an acquisition impossible message indicating impossible acquisition of the software to the communication terminal 20, thereafter ending processing in the server 30 (Step S503).

On the other hand, if the search ends up with a successful result and there is a software program applicable to the second in-vehicle terminal 10 ("Yes" at Step S502), the software distributing section 317 proceeds to Step S504 for further processing.

At Step S504, the software distributing section 317 generates a URL to download the software searched by the communication terminal 20, via the HTTP server processing section 316. Then, the software distributing section 317 notifies the communication terminal 20 of the URL and the software unique key request information (the information "B") (Step S505).

Upon receiving the URL and the software unique key request information (the information "B"), the software acquiring section 212 in the communication terminal 20 first saves the software unique key request information in the storage unit 22 (Step S506). Then the software acquiring section 212 accesses the URL, via HTTP client processing section 215, to download the software therefrom, by adding the saved software unique key request information (the information "B") (Step S507).

Subsequently, regarding the software unique key request information (the information "B") obtained at Step S507, the authentication information verifying process 311 in the server 30 searches in the in-vehicle terminal management DB 300 (Step S508), verifies the software unique key request information (Step S509) and determines the verification result ("Authentication OK?") (Step S510). Since the processes at Steps S508 through S510 are same as those at Steps S305 through S307 in FIG. 8 described above, the description will be omitted.

At Step S510, if the authentication is unsuccessful for the software unique key request information (the information "B") ("No" at Step S510), the authentication information verifying section 311 transmits an authentication information invalid message, indicating unsuccessful authentication, to the communication terminal 20, for ending the process (Step S511).

On the other hand, if the authentication is successful for the software unique key request information (the information "B") at Step S510 ("Yes" at Step S510), the software distributing section 317 transmits the encrypted software with the software unique key, by the cryptographic processing section 314, to the communication terminal 20 (step S512).

The communication terminal 20 saves the received encrypted software in the storage unit 22 (Step S513).

In the state that the encrypted software applicable to itself is stored in the storage unit 22 in the communication terminal 20, it is possible for the second in-vehicle terminal 10 to install the software, by executing the software unique key acquisition process shown in FIG. 8 according to the first embodiment of the present invention.

As described above, when installing the software in each of the plurality of the in-vehicle terminals 10, the information distribution method, the information distribution system 1 and the in-vehicle terminal 10 according to the second embodiment of the present invention is capable to prevent the software from being installed in other in-vehicle terminals 10 that are not meant for distribution. In addition, based on the software unique key request information obtained from the second in-vehicle terminal 10, the server 30 determines whether or not the software is applicable to the sort of the second in-vehicle terminal 10. If it is not applicable, the server 30 redistributes the software program applicable to the second in-vehicle terminal 10. Thus, it is possible, compared to the prior art, to eliminate the need for repeating the entire series of processes individually, from the first process of the terminal authentication up to the software installation, for each of the in-vehicle terminals 10 and reduce the time to download for installing the software that is applicable to the second in-vehicle terminal 10.

What is claimed is:

1. An information distribution method for use in an information distribution system including one or more in-vehicle terminals, a communication terminal, and a server, to distribute software applicable to each of the in-vehicle terminals via the communication terminal, from the server, the method comprising:
   storing, by each of the one or more in-vehicle terminals each of which is connected with the communication terminal over a terminal-to-terminal communication, unique terminal identification information and a terminal unique key therein, and
   storing, by the server, which is connected to each of the one or more in-vehicle terminals via the communication terminal, server-side terminal identification information and a server-side terminal unique key that are same as the terminal identification information and the terminal unique key stored individually in each of the in-vehicle terminals, and also storing therein encrypted software of a software program that is individually applicable to each of the in-vehicle terminals and software unique keys that are used for encrypting the software,
   transmitting, by the communication terminal, a request for authentication information to the in-vehicle terminal;
   transmitting, by the in-vehicle terminal, the terminal identification information and a transmission timestamp to the server via the communication terminal;

retrieving, by the server, a last authentication timestamp based on the terminal identification information from a database;

comparing, by the server, a predetermined threshold time value from the last authentication timestamp to obtain a difference timestamp;

transmitting, by the server, an invalid message indicative of invalid authentication information to the in-vehicle terminal via the communication terminal, on a condition that the difference timestamp is newer than the transmission timestamp;

transmitting, by the server, the encrypted software to the in-vehicle terminal via the communication terminal, on a condition that the difference timestamp is older than the transmission timestamp;

receiving, by the in-vehicle terminal, the encrypted software; and installing, by the in-vehicle terminal, the encrypted software.

2. The information distribution method according to claim 1, wherein the method further comprises:

saving, by the communication terminal, the terminal identification information and the timestamp therein, on a condition that the terminal authentication for the in-vehicle terminal performed by the server is successful.

3. The information distribution method according to claim 2, wherein the method further comprises:

transmitting, by the communication terminal, the terminal identification information and the timestamp saved therein to the server on a condition that the in-vehicle terminal acquires the encrypted software.

4. The information distribution method according to claim 1, wherein the method further comprises:

transmitting, by the in-vehicle terminal, the identification information of the encrypted software to the server via the communication terminal;

obtaining, by the server, the unique key used for encrypting the software, based on the identification information of the encrypted software received from the in-vehicle terminal;

generating, by the server, authentication information for the software unique key and transmitting the authentication information to the in-vehicle terminal via the communication terminal; and decrypting, by the in-vehicle terminal, the encrypted software stored therein and installing the encrypted software on a condition that authentication for the software unique key is successful by verifying the authentication information for the software unique key.

5. The information distribution method according to claim 1, wherein the method further comprises, on a condition where the in-vehicle terminal is a second in-vehicle terminal different from the in-vehicle terminal that has transmitted the terminal identification information and the transmission timestamp to the server via the communication terminal:

determining, by the server, whether or not the software corresponding to the software unique key is applicable to the second in-vehicle terminal, after obtaining the software unique key used for encrypting the software;

generating, by the server, on a condition that the software is determined to be applicable to the second in-vehicle terminal, authentication information for the software unique key and transmitting the authentication information to the second in-vehicle terminal via the communication terminal; and obtaining, by the server, on a condition that the software is determined not to be applicable to the second in-vehicle terminal, an encrypted software applicable to the second in-vehicle terminal and transmitting the encrypted software to the second in-vehicle terminal via the communication terminal, by adding identification information of the encrypted software.

6. An information distribution system, for distributing software, comprising:

a communication terminal;

one or more in-vehicle terminals, each connected with the communication terminal over a terminal-to-terminal communication; and a server that is connected to each of the one or more in-vehicle terminals via the communication terminal;

wherein each of the one or more in-vehicle terminals are each configured to:

store unique terminal identification information and a terminal unique key therein, transmit the terminal identification information and a transmission timestamp to the server via the communication terminal;

receive encrypted software and store therein;

transmit identification information of the encrypted software, added to the encrypted software, to the server via the communication terminal; and decrypt the encrypted software stored therein and installs the encrypted software, on a condition that authentication for a software unique key is successful by verifying received authentication information for the software unique key, and the server is configured to:

store therein server-side terminal identification information and a server-side terminal unique key that are same as the terminal identification information and the terminal unique key stored individually in each of the one or more in-vehicle terminals, store therein encrypted software of a software program that is individually applicable to each of the one or more in-vehicle terminals and software unique keys that are used for encrypting each of the software, and:

retrieve a last authentication timestamp based on the terminal identification information from a database;

compare a predetermined threshold time value from the last authentication timestamp to obtain a difference timestamp;

transmit an invalid message indicative of invalid authentication information to the in-vehicle terminal via the communication terminal, on a condition that the difference timestamp is newer than the transmission timestamp;

transmit the encrypted software to the in-vehicle terminal via the communication terminal, on a condition that the difference timestamp is older than the transmission timestamp;

transmit identification information of the encrypted software, attached to the encrypted software, to the server via the communication terminal; obtains the software unique key used for encrypting the software, based on the identification information of the encrypted software received from the in-vehicle terminal; and generate authentication information for the software unique key and transmit the authentication information to the in-vehicle terminal, via the communication terminal.

7. The information distribution system according to claim 6,
wherein, in case of the in-vehicle terminal being a second in-vehicle terminal different from the in-vehicle terminal that has transmitted the terminal identification information and the transmission timestamp to the server via the communication terminal,
wherein the server is further configured to:
determine whether or not the software corresponding to the obtained software unique key is applicable to the second in-vehicle terminal, after obtaining the software unique key used for encrypting the software;
generate, on a condition that the software is determined to be applicable to the second in-vehicle terminal, authentication information for the software unique key and transmits the authentication information to the second in-vehicle terminal via the communication terminal; and
obtain, on a condition that the software is determined not to be applicable to the second in-vehicle terminal, the encrypted software applicable to the second in-vehicle terminal and transmits the encrypted software to the second in-vehicle terminal via the communication terminal, by adding identification information of the encrypted software.

8. A non-transient computer readable medium containing program instructions for causing a computer to perform a method in an information distribution system including one or more in-vehicle terminals, a communication terminal, and a server, the method comprising:

storing, in each of the one or more in-vehicle terminals, unique terminal identification information and a terminal unique key therein,
storing, server-side terminal identification information and a server-side terminal unique key that are same as the terminal identification information and the terminal unique key stored individually in each of the in-vehicle terminals, and also storing therein encrypted software of a software program that is individually applicable to each of the in-vehicle terminals and software unique keys that are used for encrypting the software,
transmitting, a request for authentication information from the communication terminal to the in-vehicle terminal;
transmitting, from the in-vehicle terminal to the server, the terminal identification information and a transmission timestamp;
retrieving, by the server, a last authentication timestamp based on the terminal identification information from a database;
comparing, by the server, a predetermined threshold time value from the last authentication timestamp to obtain a difference timestamp;
transmitting, from the server to the in-vehicle terminal, an invalid message indicative of invalid authentication information on a condition that the difference timestamp is newer than the transmission timestamp;
transmitting, from the server to the in-vehicle terminal, on a condition that the difference timestamp is older than the transmission timestamp;
receiving, by the in-vehicle terminal, the encrypted software; and
installing, by the in-vehicle terminal, the encrypted software.

* * * * *